(12) United States Patent
Demirbasa et al.

(10) Patent No.: US 8,032,084 B2
(45) Date of Patent: *Oct. 4, 2011

(54) DATA SECURITY DEVICE

(75) Inventors: Saban Demirbasa, London (GB); Stephen Bloch, Medmenham (GB); Alistair Curry, London (GB)

(73) Assignee: Data Transfer & Communications Limited, Derbyshire (GB)

( * ) Notice: Subject to any disclaimer, the term of this patent is extended or adjusted under 35 U.S.C. 154(b) by 351 days.

This patent is subject to a terminal disclaimer.

(21) Appl. No.: 11/822,288

(22) Filed: Jul. 3, 2007

(65) Prior Publication Data

US 2008/0014869 A1  Jan. 17, 2008

Related U.S. Application Data

(63) Continuation-in-part of application No. 11/440,353, filed on May 25, 2006, which is a continuation-in-part of application No. 10/484,025, filed on Jan. 15, 2004, now Pat. No. 7,054,594.

(30) Foreign Application Priority Data

Jul. 18, 2001 (GB) ...................................... 0117530
Apr. 5, 2002 (GB) ...................................... 0207933
Dec. 2, 2005 (GB) ...................................... 0524672
Dec. 20, 2005 (GB) ...................................... 0525891

(51) Int. Cl.
*H04B 7/00* (2006.01)
*H04M 1/00* (2006.01)

(52) U.S. Cl. .................. 455/41.2; 455/556.1; 455/556.2

(58) Field of Classification Search ..................... 455/41, 455/426, 41.2, 557, 550.1, 556.1, 556.2; 370/253, 338; 340/571, 539; 709/203
See application file for complete search history.

(56) References Cited

U.S. PATENT DOCUMENTS 4,260,982 A  4/1981  DeBenedictis et al.
(Continued)

FOREIGN PATENT DOCUMENTS

DE  201 12 099 U1  10/2001
(Continued)

OTHER PUBLICATIONS

State Intellectual Property Office of the P.R.C., Office Action, Chinese Patent Application No. 2007101121802, Oct. 30, 2009.

*Primary Examiner* — Kiet Doan
(74) *Attorney, Agent, or Firm* — Stites & Harbison PLLC; Douglas E. Jackson; Stephen J. Weyer

(57) ABSTRACT

A portable data storage device is described, which includes a short range wireless communication interface. The device is configured to communicate with a backup device over a wireless communication link and further comprises an alerting device for initiating an alert procedure on separation of the backup device from the portable data storage device. The alert procedure may include one or more of: disabling at least one function of the portable data storage device, for rendering the portable data storage device at least partially inoperable in the absence of communication from the backup device, locking the portable data storage device, generating an audible, visible or vibrational signal, restricting access to certain functions of the portable data storage device, preventing use of the portable data storage device except to telephone a specified number to report the device as lost or to re-enable the device and/or communicating a unique identifier of the portable data storage device to a network.

12 Claims, 8 Drawing Sheets

U.S. PATENT DOCUMENTS

| | | | |
|---|---|---|---|
| 4,675,656 A | 6/1987 | Narcisse | |
| 5,054,051 A | 10/1991 | Hoff | |
| 5,467,341 A * | 11/1995 | Matsukane et al. | 370/253 |
| 5,757,271 A | 5/1998 | Andrews | |
| 5,801,627 A | 9/1998 | Hartung | |
| 5,933,773 A | 8/1999 | Barvesten | |
| 6,011,473 A * | 1/2000 | Klein | 340/571 |
| 6,151,493 A | 11/2000 | Sasakura et al. | |
| 6,212,175 B1 * | 4/2001 | Harsch | 370/338 |
| 6,334,046 B1 | 12/2001 | Philipson et al. | |
| 6,445,921 B1 * | 9/2002 | Bell | 455/426.1 |
| 6,504,480 B1 | 1/2003 | Magnuson et al. | |
| 6,614,350 B1 | 9/2003 | Lunsford et al. | |
| 6,973,476 B1 * | 12/2005 | Naden et al. | 709/203 |
| 7,715,831 B2 | 5/2010 | Wakefield | |
| 2001/0049262 A1 * | 12/2001 | Lehtonen | 455/41 |
| 2001/0052846 A1 * | 12/2001 | Jespersen | 340/539 |
| 2004/0128129 A1 | 7/2004 | Sherman | |

FOREIGN PATENT DOCUMENTS

| | | |
|---|---|---|
| EP | 0798651 A | 10/1997 |
| EP | 1293962 | 3/2003 |
| GB | 2406471 A | 3/2005 |
| GB | 0524672 | 6/2007 |
| GB | 0525891 | 6/2007 |
| WO | WO 94/12938 | 6/1994 |
| WO | WO 98/34417 | 8/1998 |
| WO | WO 03/024072 A1 | 3/2003 |
| WO | WO 03/039014 | 5/2003 |

* cited by examiner

DATA SECURITY DEVICE

CROSS-REFERENCE TO RELATED APPLICATIONS

The present application is a continuation-in-part application of U.S. application Ser. No. 11/440,353, filed May 25, 2006, now pending, which is a continuation-in-part application of U.S. application Ser. No. 10/484,025, filed Jan. 15, 2004, now U.S. Pat. No. 7,054,594

The present invention is concerned with the security of data stored on portable data storage devices, particularly, but not exclusively devices such as hand-held organisers or PDA devices or mobile telephones, most particularly mobile telephones. The invention is also concerned with the security of the portable data storage devices themselves and with the remote operation of portable data storage devices, such as mobile telephones or PDA devices.

In recent years, there has been a widespread increase in the usage of small portable devices for the storage of important data such as contact and calendar information. Devices have become much more user-friendly, much smaller and much more powerful increasing the number of applications for such devices and the usefulness of such devices. The increasing portability and power of such devices has had many benefits but has one drawback, namely that it is easy to mislay or lose a device containing large amounts of useful data.

The risk of loss or damage has been appreciated and many devices are provided with the facility to backup data onto another device, such as a desktop or other computer. Often this involves making a physical connection using a cable although devices with IrDA (infra-red) communication interfaces are available. The backup process, however it is implemented, normally requires positive intervention on the part of the user and can be labourious. As a result, data on portable devices may not be backed up very frequently. Thus, even a user of above average diligence in backing up the data is liable to lose a significant amount of useful data in the event of loss of the device.

Further, as portable data storage devices become more powerful, more portable and are provided with greater storage capacities, they are being used to store both larger amounts of data and a larger variety of data. Devices are also being provided with an increasing variety of functionality. For example, devices are not only being used to store and retrieve data, such as text, video and audio data, but can also obtain, store and run applications, such as games and business tools.

Also, as the processing and storage capacity of devices increases and the use of the devices becomes more widespread, many devices are being used to store information that it is important should not be lost, for example business critical information such as email messages, multimedia or text messages or data files. For the individual user, it is also important to ensure the security of data since, for example, a user may have paid to download content or applications from the network or messages and photographs may be of personal importance to the user.

It can also be inconvenient and disruptive to use portable data storage devices, since it is necessary to extract the device from a pocket or bag before use. Hands-free kits have been developed to allow a user to operate the portable data storage device remotely, in particular by use of an earpiece placed in the ear of the user but it can be inconvenient and impractical to have such devices attached to the user's body for long periods of time on the possibility that the portable data storage device may need to be used. Further, if the user does not keep the earpiece in their ear at all times, then it is equally inconvenient to find the hands-free device as it is to find the portable data storage device when, for example, the telephone rings.

The present invention aims generally to address the problem of reducing the risk of loss of data stored in a portable data storage device, particularly a mobile telephone and of increasing the ease of use of a portable data storage device.

According to one aspect there is provided a portable data storage device having a short range wireless communication interface and configured to communicate with a backup device over a wireless communication link, the device further comprising an alerting device for initiating an alert procedure on separation of the backup device from the portable data storage device.

Further aspects are set out in the independent claims and preferred features are set out in the dependent claims. It will be clear to one skilled in the art that preferred features of one aspect may be applied to other aspects and modifications of detail may be provided within the scope of the claims. Features of the systems and methods described below may also be implemented in conjunction with the claimed system.

There is further described herein a method of safeguarding against loss of data stored in a portable data storage device, the method comprising providing user-carried a backup device having memory and a wireless communication link for communicating with the portable data storage device;

communicating periodically or quasi-continuously over the wireless communication link with the portable data storage device to backup data entered into the portable data storage device and to check for removal of the portable data storage device;

signalling an alarm to alert a user to loss of the portable data storage device if the portable data storage device is out of range of communication for a predetermined period.

In this way, the backup device contains data (or selected data) stored in the portable storage device and so, if the device is lost, the backup data can be retrieved. Furthermore, if the device is moved out of range, an alarm is sounded so that the user is alerted that they have left the portable storage device behind. The alarm is preferably provided by the backup device, preferably as at least an audible (and/or vibrating and/or visible) alarm. However, an alarm may be provided additionally or alternatively by the portable data storage device.

Thus, embodiments may both avoid the need for regular manual backup and reduce the risk of loss of the device in the first place. The solution provided by the invention effectively reduces both the risk of loss of the device and the risk of loss of data even if the device is lost, most conveniently using a single communication link to achieve both functions. Although detection of the devices being out of range may be conveniently achieved by detecting breakdown of the communication link, this detection may be supplemented or substituted by a further ranging function, for example if a more precise specification of range is required or if an early warning of the limits of the range being exceeded is desired while a communication link still exists.

An alert procedure, for example the activation of the alarm and/or the disabling of the portable data storage device, may be initiated when the secondary further-ranging communication link comes into use. Hence, initiation of the alert procedure may either be an active process, for example the alert procedure may be activated on receipt of a signal over the secondary further-ranging communication link, or it may be a process which is initiated due to the lack of a signal, for example the process may be initiated when the communication over the first communication link fails.

The communication link is preferably a short-range link. It will be appreciated that the effective range need not be precisely defined and in practice will vary depending on ambient conditions but should be set so that the communication link breaks down at a separation distance between the two devices consistent with the user having left the data storage device behind. Typically, this distance will be of the order of 10 meters but smaller or greater distances may be employed depending on the application. The distance may be selectable by the user. For example, if the user wishes to be alerted to possible theft of the device in a crowded place such as on public transport, a separation distance of the order of 1 meter or possibly even less may be appropriate to trigger the alert. If a user is working in a large open-plan office space and is happy to leave the data device in the office but wishes to be alerted to having left it behind when he leaves the building, a distance of 50 meters or even 100 meters may be appropriate.

In addition to operating the backup device at a number of different range settings, the backup device may also operate at a selected one of a number of different retry rates. That is, the backup device may communicate with the portable data storage device at predetermined intervals. These intervals may be user defined or selected. Alternatively, they may be correlated to the range settings described above, for example the backup device may communicate with the portable data storage device a number of times each second if the separation distance is required to be less than 1 meter, but only at intervals of several seconds if the separation distance may be up to 100 meters. A further alternative is for the intervals to increase automatically over time if the separation between the devices remains constant. For example, the interval may be decreased from a second to several seconds if the portable data storage device and the backup device are not separated by more than a few meters over a time period of an hour (for example, if the owner of the portable data storage device is sitting close to the device at a desk in an office).

It will be appreciated then that communication between the backup device and the portable data storage device may be operated at a selected one of a number of different power levels. This may help to conserve the power for the backup device and the portable data storage device in some situations. For example, when only infrequent communication with the portable data storage device is required, when communication is required only over a short range, or when backup of data across the communication link is not required, the communication link may operate at a lower power level. The communication range or frequency of communication may be selected automatically or manually, hence allowing the automatic selection of the most suitable power level for the operation of the portable data storage device and backup device. For example, the communication link may operate initially at a first power level, but may switch to operating at a second power level if the portable data storage device does not pass out of range of communication with the backup device throughout a predetermined time period. In this example, operating at a lower power level may comprise reducing the frequency of communication between the portable data storage device and the backup device, or reducing the range of the communication link.

Most preferably, the communication link is a wireless radio link and most preferably, the link is a Bluetooth (Registered Trade Mark) (or similar) radio link. Bluetooth® operates at approximately 2.4 GHz and provides secure communication between devices up to distances of the order of 10 meters, which is ideal for the present application. However, other forms of radio link may be used, for example a 415 MHz low power transceiver link, as used, for example, for remote control alarm keys and the like. The latter also has the advantage that low-cost compact transceivers are readily available. An advantage of using higher frequencies is that more compact transceivers can be employed whilst still having relatively efficient antenna for the radio transceiver. Nevertheless, in view of the short communication distances required, as will be appreciated, any of a variety of available frequencies may be used. In a further embodiment, an alternative wireless communication link, such as an 802.11a or 802.11b link may be used.

The wireless link need not use radio; for example, an ultrasonic link may be employed in certain cases. In certain cases, a contact based link may be employed, for example based on transmission of data by coupling to a user's body.

Preferably, at least one unique identifier of the portable data storage device may be transferred over the wireless communication link to the backup device. This unique identifier may be an IMEI number, if the portable data storage device is a mobile telephone, or, more preferably, the unique identifier may be a Bluetooth® serial number. Each Bluetooth® chip has a unique Bluetooth® serial number, which it difficult to alter. Hence the Bluetooth® serial number may be used as a reliable and unique 'tag' for the portable data storage device.

According to a related and highly preferable feature, the data transferred to the backup device may include at least one of: a unique identifier of the portable data storage device, a unique identifier of a subscriber module associated with the portable data storage device and user profile data for the portable data storage device.

Preferably, the portable data storage device is a mobile telephone and the unique identifier of the portable data storage device is the International Mobile Equipment Identity (IMEI) number of the mobile telephone. Further preferably, the unique identifier of a subscriber module associated with the portable data storage device is an identifier of the Subscriber Identity Module (SIM).

Backing up an identifier of the portable data storage device to the backup device may allow a lost or stolen portable data storage device to be uniquely identified without a user actively discovering and storing the identifier. For example, the IMEI number of a mobile telephone may be transferred to the backup device so that the IMEI number may be transferred to the operator of the mobile telecommunications network if the mobile telephone is lost or stolen. This may allow the operator to prevent use of the lost or stolen mobile handset that corresponds to that IMEI number immediately.

According to one embodiment, a user whose portable data storage device or mobile telephone has been lost or stolen may present the backup device, onto which the unique identifier, for example the IMEI number, has been stored to an authorised controller, for example the mobile telephone network operator or the police. The authorised controller may download the information stored in the backup device and may, for example, use the IMEI number to block use of the mobile telephone handset or to track the handset. The user may transfer the data from the backup device to the mobile telephone network operator at an easily accessible location, for example at a retail outlet connected to the mobile telephone network operator. The retail outlet preferably has a central control device which can read data stored on each backup device. In this way, the IMEI number can be easily and quickly transferred to the network operator without the portable data storage device user having to actively discover and retain the IMEI number.

Further data may also be transferred to the backup device, for example, the SIM identifier of a mobile telephone may be stored in the backup device and the mobile telephone operator may use the data to prevent use of a lost or stolen mobile telephone or SIM card.

Having data such as the IMEI number and SIM identifier easily available may increase security for users of the mobile telephone network and may prevent the use of lost or stolen mobile telephones.

According to a further, highly preferably feature, the portable data storage device is a mobile telephone and the user profile data for the portable data storage device includes at least one of: data stored in the mobile telephone handset, call settings, telephone settings, security settings, call divert settings, display settings, tone settings, message settings, call register settings, available prepaid credit and internet access settings.

The user profile data may include, for example the PIN code used to access the portable data storage device and the settings of the portable data storage device, such as ring-tone settings or keypad tone settings. The type of user profile data that is stored on the backup device will depend on the type of portable data storage device. According to a preferable embodiment, it is possible for the user profile data stored on the backup device to be downloaded onto a new portable data storage device. This may be useful, for example, if a user loses the portable data storage device or has it stolen, or if the user purchases a new portable data storage device. In these situations, the user profile information stored in the backup device may be uploaded to the new portable data storage device, so that the new portable data storage device can be set up very quickly to operate in essentially the same way as the lost, stolen or old portable data storage device. This may allow the user to start using the portable data storage device as quickly as possible without having to reset all of the settings and user-preferences manually.

The data may be uploaded from the backup device to the new portable data storage device by the user but is preferably uploaded by the vendor of the new portable data storage device. This may be done in conjunction with the vendor obtaining information on behalf of the network, such as obtaining the IMEI number of the lost or stolen mobile telephone, as described above.

Preferably, the method includes receiving a user input to cancel an alert or to disable the alarm. The user input may be provided prior to the alarm being activated or after the alarm has been activated. This enables a user to keep the backup device with them and not be constantly alerted to having (deliberately) left their data storage device elsewhere.

In order to avoid further unnecessary triggering of the alarm, signalling of the alarm may be suspended if the wireless communication link is being used by the portable data storage device. Preferably, the backup device has the capability to detect whether the wireless communication link is being used by the portable data storage device. For example, if the wireless communication link is being used by the portable data storage device to communicate with a further device, for example a computer, it may not be possible for the portable data storage device to maintain its periodic communication with the backup device. In order to avoid an alert being triggered in this situation, however, the backup device may detect the use of the Bluetooth® link by the portable data storage device and suspend triggering of the alarm.

Instead of, or in addition to the alarm being signalled, an alert procedure may be initiated by the portable data storage device if the portable data storage device is out of range of communication with the backup device for a predetermined period. This alert procedure may comprise any of the procedures outlined below. A preferable alert procedure, however, may involve the at least partial disabling of the portable data storage device. For example, as described in more detail below, the keypad of a mobile telephone may be disabled, or a signal may be sent to a network, for example the mobile telecommunications network, to prevent the use of that portable data storage device over the network.

In a most preferred application, the data storage device is configured so as to be at least partially inoperable in the absence of communication with the backup device. The data storage device may be configured so as to become partially or completely disabled if communication from the backup device has not been received within a predetermined time period. The partial or total disabling of the device may be over-rideable by a user, either by disarming the disabling feature in advance of the portable data storage device going out of range or by entry of an appropriate password or pin number into the data storage device. Disablement may be temporary so that functionality of the device is resumed when communication is re-established. This may enable a user to leave a mobile telephone which is inoperable unless the user, with the backup device, is within range. Partial disablement may, particularly in the case of a mobile telephone, include access to only certain functions. For example, if a mobile telephone is out of range of the backup device, use may be restricted to dialling a number to report the phone as lost or to receive delivery of the user information for returning the phone or to provide a code or password to a central control centre to re-enable the portable data storage device.

Further alert procedures which may be initiated at the portable data storage device are described in more detail below, but they may include: alerting a separate network (for example a mobile telecommunications network) which may allow the portable data storage device to be disabled remotely, displaying a message (which may include details of how to return the portable data storage device) to indicate that the portable data storage device has been lost or stolen, or passing data to a separate network (for example, the mobile telecommunications network). In the last case, the data may include, for example, location information, or a unique identifier of the portable data storage device.

The data in the portable data storage device may be backed up to the backup device periodically or in response to the entering of new data into the portable data storage device. Data stored in the backup device may be backed up to a further device for increased security, and may be accessible by the further device. For example, data stored in the portable data storage device may be backed up to a computer and may be viewed on that computer. However, access may be restricted to only a portion of the data.

To increase security, it may be necessary to register the backup device with the portable data storage device before use. This may help to ensure that data is only transferred out of the portable data storage device to a recognised backup device.

According to a further preferred feature, the backup device may communicate with a separate network. This may allow the backup device to signal to a remote station in the network, for example a mobile telecommunications network, if the portable data storage device is out of range of communication. The backup device may transmit a unique identifier of the portable data storage device to the network, which may use the identifier for example to disable the portable data storage device remotely, or to locate the portable data storage device.

According to a further aspect, there is provided a method of operating a portable data storage device, the method comprising communicating periodically or quasi-continuously with a backup device over a wireless communication link to back up data stored within the portable data storage device. Preferably, an alert procedure may be triggered when the backup device is out of range of communication with the portable data storage device. The alert procedure triggered may comprise one of the alert procedures outlined above and may comprise triggering an audible, visual or vibrating alarm on the portable data storage device itself. Preferably, the alert procedure comprises disabling at least one function of the portable data storage device. The alert procedure may also comprise communicating a unique identifier of the portable data storage device to a network, which may be a mobile telecommunications network. The alert procedure may be triggered if the portable data storage device is out of range of communication with the backup device or may be triggered upon receipt of a signal over a wireless communication link operating within a second range when the portable data storage device has passed out a first range of communication with the backup device.

According to a further aspect, there is herein provided a method of operating a backup device, the method comprising periodically communicating with a portable data storage device over a wireless communication link to backup data stored in the portable data storage device; and triggering an alert procedure when the portable data storage device is out of range.

Preferred features of the operation of the backup device may be the same as those outlined above. According to a highly preferable feature, however, it may be necessary to pre-register the portable data storage device with the backup device before the two devices may be paired and before communication can be initiated. This may reduce the risk of unauthorised portable data storage devices communicating with the backup device and downloading data from the backup device. A plurality of portable data storage devices may be pre-registered and paired with the backup device. The backup device may be placed into an 'authorisation' mode of operation in order to allow registration and pairing. An alert proceude may be triggered in the event that an unauthorised device attempts to pair with the backup device.

A convenient way both of securing data and preventing unauthorised access to a mobile telephone (or similar device) may be to have a SIM card (or equivalent data storage device) for the mobile telephone provided in the backup device. In that way, when the backup device and mobile telephone are separated, the telephone is unusable and furthermore, the data in the SIM card is inherently secured. This may also enable the backup device to be used with devices such as "disposable" mobile telephones. These features may be provided independently. A further aspect provides a mobile telephone having a (short range) wireless link to a remote device containing SIM card data for the mobile telephone.

As used herein, the term mobile telephone is intended to encompass devices which are capable of text or data or graphic or video communication as well as or instead of voice communication, where the context so requires.

It has been appreciated by the inventors that the requirement for the backup device to have memory and a communication device may in fact be satisfied by another portable data storage device, such as a PDA. Thus, it is possible to implement the backup device as an application for another portable data communication device, such as a PDA.

In a development, it is possible for two (or more) portable data storage devices to be used to perform mutual backup and security functions for each other. It is greatly preferred, however, if the backup device is not a fully functional data storage device but has limited or no user input and output functions.

Surprisingly, therefore, it is advantageous for the device to be provided with little functionality. Pursuant to the invention it has been appreciated that the backup device must be compact if it is to be carried with the user, which limits the user input and output interfaces which can usefully be provided. Furthermore, if the device has limited functionality, it is less likely that the user will use (and therefore possibly lose) the backup device itself. In preferred implementations, the backup device is compact and provided as a device which may be readily carried with the user, such as a credit-card sized device, a watch or watch insert, a key-ring or a clip-on device which can securely clip to a user or to an article of clothing. The backup device may have means for attaching securely but preferably removably (optionally permanently) to a person or to an article of clothing, such as a wrist strap, a clip, a belt clip, a pin or safety pin, a Velcro™ fastener, a tie clip, a self-adhesive pad or any other suitable fastening.

According to a further aspect, there is also provided a method of safeguarding against the separation of a central portable data storage device and at least one tagging device, the method comprising:

providing at least one wireless communication link for communicating between the central portable data storage device and the or each tagging device;

communicating periodically between the or each tagging device and the central portable data storage device over the or each wireless communication link;

initiating an alert procedure if the or each tagging device is out of range of communication with the central portable data storage device.

The central portable data storage device, or control unit, may be operated, for example, by an adult, who may provide a tagging to device to one or more children, or to a pet. The alert procedure may comprise displaying an identifier of the tagging device that is out of range, for example, a photograph of the holder of the tagging device. Further details of the users of the tagging devices may be stored either on the central portable data storage device or on the tagging units themselves. These details may include, for example identification details, medical records or selected medical details, or 'pet passport' details. The medical details stored may include, for example details of a past medical history, such as past heart attacks, or details specific to the user of the tagging device, for example if the user has diabetes or an allergy to a particular drug or food.

The backup device can, using current technology, be made very compact as it need only include a communication device, such as a Bluetooth® chip (which may be smaller than a postage stamp), some (flash) memory, limited processing power and a power source. All of these functions can readily be integrated into a small device, so small in fact that the backup device itself may be easy to misplace, which is why it is desirable for it to be securely attachable to clothing or integrated into another form of housing which the user is likely to use.

Preferably, the backup device is integrated into a housing which has functionality other than as a data storage device, for example as a key-ring, a credit-card, a watch or the like, as noted above.

There is also herein provided a method of securing a mobile telecommunications device comprising communicating between the device and a backup device to record a unique identifier of the mobile telecommunications device, preferably the IMEI number and/or the SIM card identifier, preferably automatically on initiation of backup of data to the backup device.

There is also described herein a method of creating a message at a primary device having data storage and long range communication capabilities, the message comprising a header including a destination identifier for the message and a message payload including text data, the method comprising:

receiving audio data from a user at a secondary device connected to the primary device over a short range wireless communication link;
processing the audio data to convert the audio data to text data;
obtaining a destination identifier for the message;
generating a message incorporating the text data in the message payload and the destination identifier in the message header;
transmitting the message to the primary device over the short range wireless communication link.

Advantageously, the method may allow a user to create a message to be sent from a primary device (e.g. a portable data storage device such as a mobile telephone or cell phone) by providing only audio data, such as voice commands. Implementing this functionality at a separate secondary device, rather than at the primary device itself, may enable the functionality to be implemented easily on many different types of primary device without requiring customised application software.

The method set out above may enable hands-free text messaging, which may be useful when it is not possible for the user to operate the primary device directly with their hands, for example when the user is driving or if the user is disabled. Alternatively, the method may simply provide the user with the option of creating messages using audio commands, which may provide a faster and more convenient input method than prior art text input methods.

Preferred features of this aspect are set out in the dependent claims and advantages of the preferred features will be clear to one skilled in the art and are set out in more detail in the description below. Corresponding apparatus and computer program or computer program product aspects are also provided and preferred features of the method may also be applied to these corresponding aspects.

There is also described herein a communication device comprising:
means for communicating with a portable data storage device over a short-range wireless communication link to transmit audio and/or video data between the portable data storage device and a user in real-time;
output means for outputting audio and/or video data received from the portable data storage device to the user;
input means for receiving audio and/or video data from the user for transmission to the portable data storage device;
means for supporting the communication device in relation to the user, away from the ear of the user.

This may allow a user to communicate via the portable data storage device without requiring access to the portable data storage device itself. Further, since the communication device is supported in relation to the user but away from the user's ear, the user is not required to insert a headset in their ear each time they wish to use the device. Neither is the user required to retain a headset in their ear for an extended period of time on the chance that they may need to use the portable data storage device. Rather, the communication device is supported discreetly and unobtrusively within range of the user.

The means for supporting may comprise means for attaching the communication device to an article of clothing or an accessory of the user. For example, the means for supporting may comprise a pin or a clip for attaching the device to a user's clothing, such as at a lapel, or to an accessory, such as a user's bag.

The means for supporting may comprise a ligature for securing the communication device around a portion of the user's body, such as around the user's neck. Hence the device may be implemented as a pendent for the user to wear around the neck. Alternatively, the ligature may be used to attach the device to an accessory, such as a bag.

In one embodiment, the communication device further comprises means for communicating periodically or quasi-continuously with the portable data storage device over a short-range wireless communication link to back up data stored on the portable data storage device. Hence the communication device may also act as a backup device for backing up data from the portable data storage device, either automatically at predetermined time intervals or on instigation of a backup procedure by the user.

There is also described herein a communication device for backing up data stored on a portable data storage device, the communication device comprising:
means for communicating periodically or quasi-continuously with the portable data storage device over a short-range wireless communication link to back up data stored on the portable data storage device;
means for communicating with the portable data storage device over the short-range wireless communication link to transmit audio and/or video data from the portable data storage device to a user in real-time.

Hence the communication device may act both as a backup device and as a means for transmitting data to the user. Data that may be transmitted may include text message or multimedia message data, audio or video message data (such as voicemail messages) or audio data currently being received at the portable data storage device, for example due to an incoming telephone call. The data is preferably forwarded to the communication device and communicated to the user on receipt by the portable data storage device.

According to a highly preferred embodiment, the device further comprises means for transmitting audio and/or video data from the user to the portable data storage device in real-time. Hence the link between the user and the portable data storage device, via the communication device is preferably a two-way link.

In a preferred embodiment, the communication and backup device further comprises means for supporting the communication device in relation to a user, away from the ear of the user. For example, the device may be provided with a pin or clip or a key-ring attachment or may be provided with means for suspending the device around a part of the user's body, for example a ligature to enable the device to be hung around the user's neck.

Preferably, either device described above may further comprise means for monitoring receipt of real-time audio and/or video data at the portable data storage device and notifying the receipt of the data to a user.

Preferably, the device further comprises means for receiving a command, from a user and means for commencing the transmission of audio and/or video data in response to the command.

The means for receiving a command may comprise a button or means for receiving an audio command, such as a voice command recognition system.

In one embodiment, the device may further comprise means for displaying video and/or text-based data to the user. For example a colour or monochrome LCD display.

Preferably, the short-range wireless communication link comprises a BlueTooth™ communication link.

There is also described herein a method of operating a communication system comprising:

providing a portable data storage device and a backup device;

communicating periodically or quasi-continuously between the portable data storage device and the backup device over a short-range wireless communication link to back up data stored on the portable data storage device;

communicating between the portable data storage device and the backup device over the short-range wireless communication link to transmit audio and/or video data from the portable data storage device to the user in real-time.

There is also described herein a method of operating a communication device, the communication device being supported in relation to the user, away from the ear of the user, the method comprising:

communicating with a portable data storage device over a short-range wireless communication link to transmit audio and/or video data between the portable data storage device and a user in real-time;

outputting audio and/or video data received from the portable data storage device to the user;

receiving audio and/or video data from the user for and transmitting the data to the portable data storage device.

There is also described herein a method of backing up portions of data stored on a portable data storage device, the method comprising:

classifying each portion of data into one of a plurality of predefined data types;

communicating periodically or quasi-continuously between a backup device and the portable data storage device to back up at least one portion of data classified as a first data type;

communicating at a predetermined rate of recurrence between the backup device and the portable data storage device to back up at least one portion of data classified as a second data type.

Hence different types of data may be backed up according to different backup cycles. For example, a first type of data may be backed up more frequently than a second type of less critical data.

The method may further comprise communicating at least one other predetermined rate of recurrence to back up data classified as least one other data type.

Preferably the method also includes determining whether the portable data storage device is in use before communicating to back up data of at least one type. For all or selected types of data, the backup cycle may not be instigated if the portable data storage device is in use, or if the communication link over which the backup device communicates is in use.

In one embodiment, the predetermined rate of recurrence for one or more types of data may be set by a user.

Classification of the portions of data may be automatic or at least one portion of data may be classified manually by the user as a particular data type. In one embodiment, individual portions of data are classified manually by the user.

Preferably, the predefined data types include one or more of:

critical and volatile data;
critical and stable data;
non-critical and volatile data;
non-critical and stable data.

Hence the data may be classified both according to its importance and the likelihood that it will change.

Preferably, the first data type comprises critical and volatile data, preferably including at least one of: operational data, calendar, reminder, alarm and task data.

The second data type may comprise critical and stable data, preferably including at least one of: directory data, data files and personal configuration information.

In one embodiment, the method may further comprise converting the format of at least one portion of data before storage.

The method may also comprise compressing at least one portion of data before storage. This may reduce the memory capacity required to store the data.

There is also described herein a backup device for backing up data from a portable data storage device, the backup device comprising:

a short-range wireless communication link;

means for communicating periodically or quasi-continuously with the portable data storage device over the wireless communication link to back up data comprising a first data type;

means for communicating at a predetermined rate of recurrence to back up data comprising a second data type;

storage means for storing the data obtained.

There is also described herein a portable data storage device comprising:

a short-range wireless communication link for communicating with a backup device;

storage means for storing data of a first data type and data of a second data type;

means for communicating periodically or quasi-continuously over the short-range wireless communication link to back up data of the first data type at the backup device;

means for communicating at a predetermined rate of recurrence over the short-range wireless communication link to back up data of the second data type at the backup device.

There is also described herein a method of transferring data from a portable data storage device, the method comprising:

communicating over a short-range wireless communication link to back up data stored in the portable data storage device to a backup device;

communicating over a second data transfer link to transfer data stored in the backup device to a third device.

This may allow a transfer of data from a portable data storage device, such as a mobile telephone, to a third device, such as a printer or a PC, without directly connecting the two devices. This may allow the backup device to act as an intermediary between the two devices if the interfaces or software is not directly compatible. The backup device may be used, for example, to convert the format of files being transferred or to provide an interface to a large variety of devices.

The second data transfer link may comprise a physical link, such as via a cable or a direct connection (e.g. a USB connection) between the backup device and the third device.

In one embodiment, the backup device may comprise a removable memory unit and communicating over the second data transfer link may comprise removing the removable memory unit and inserting the unit into the third device. The removable memory unit may be, for example a flash memory card or a USB device.

There is also described herein a method of logging a series of transactions performed at a data storage and transfer device, the method comprising:

communicating periodically or quasi-continuously with the data storage and transfer device over a wireless communications link to a remote backup device;

monitoring transactions performed by the data storage and transfer device;

logging data relating to the transactions performed at the remote backup device.

This method may allow a record of transactions performed at the data storage device to be backed up to a second device for later use or transfer to a network.

Preferably, the transactions are performed over a short-range wireless communication link, such as a BlueTooth™ link.

The transactions performed by the data storage and transfer device may be monitored by the remote backup device over the wireless communications link, which may also comprise a BlueTooth™ link.

In one embodiment, the data storage and transfer device comprises a computer. In an alternative embodiment, the data storage and transfer device comprises a portable data storage device.

The transactions may comprise at least one of: financial transactions, access request transactions or communication transactions.

In one embodiment, the method may further comprise initiating an alert procedure on identification of a predetermined transaction or type of transaction or on identification of an attempt to perform a predetermined transaction or type of transaction. For example, the alert procedure may be instigated if the portable data storage device attempts to access a particular web page.

In one embodiment, monitoring transactions may comprise monitoring data transferred over the communications link.

In an alternative embodiment, monitoring transactions may comprise monitoring data stored in the data storage and transfer device.

Preferably, the wireless communication link comprises a BlueTooth™ link.

There is also described herein a backup device comprising a secondary user-carried device for backing up data from a primary portable data storage device, the backup device comprising:
 a short-range wireless communication link;
 a communication interface for communicating with the primary portable data storage device over the communication link to receive data to back up and to check for removal of the primary portable data storage device;
 storage for storing data received over the communication link from the primary portable data storage device; and
 a triggering device for triggering an alert procedure when the primary portable data storage device is out of range for a predetermined period.

Triggering an alert procedure may comprise triggering an alarm signal. The device may further comprise a detection device for detecting whether the wireless communication link of the portable data storage device is in use. Preferably, the backup device further comprises a rechargeable battery. The backup device may be mounted in a housing for mounting on a key-ring, in a wallet, on a watch or attachable to or part of an article of clothing.

The alert that is triggered may be perceptible to a user within a pocket of the clothing of a user. The alarm that is triggered may include at least one of an audible alarm or a vibrating alarm.

The backup device may further comprise an input interface for receiving a pairing signal to allow the pairing of the backup device with the primary portable data storage device. Preferably, the backup device is configured without a user interface for enabling direct input of data into the storage.

The device may further include a communication interface for communicating data stored in the backup device to restore data to the portable data storage device or to a replacement portable data storage device. Preferably, the device further comprises an interface for communicating with a network. In one embodiment, the backup device may also include a user interface for receiving a user input to cancel the alert procedure. Embodiments may further include a registration or authorisation interface for pre-registering the portable data storage device with the backup device to authorise pairing of the backup device and the portable data storage device.

There is further described herein a primary portable data storage device comprising: storage for storing data; a short range wireless communication link; and a communication interface for communicating with a secondary backup device over the short range wireless communication link, wherein the primary portable data storage device is configured to communicate with the secondary backup device over the wireless communication link to transmit data from the storage to the secondary backup device.

There is further described herein apparatus for creating a message at a primary device having data storage and long range communication capabilities, the message comprising a header including a destination identifier for the message and a message payload including text data, the apparatus comprising: an interface for receiving audio data from a user at a secondary device connected to the primary device over a short range wireless communication link; a processor for processing the audio data to convert the audio data to text data; an interface for obtaining a destination identifier for the message; a device for generating a message incorporating the text data and the destination identifier; an output interface for transmitting the message to the primary device over the short range wireless communication link.

A communication device is also described, the device comprising: a communication interface for communicating with a portable data storage device over a short-range wireless communication link to transmit audio and/or video data between the portable data storage device and a user in real-time; an output interface for outputting audio and/or video data received from the portable data storage device to the user; an input interface for receiving audio and/or video data from the user for transmission to the portable data storage device; a device for supporting the communication device in relation to the user, away from the ear of the user.

There is also described herein a communication device for backing up data stored on a portable data storage device, the communication device comprising: a communication interface for communicating periodically or quasi-continuously with the portable data storage device over a short-range wireless communication link to back up data stored on the portable data storage device; a communication interface for communicating with the portable data storage device over the short-range wireless communication link to transmit audio and/or video data from the portable data storage device to a user in real-time.

Embodiments of the communication device may also include an interface for transmitting audio and/or video data from the user to the portable data storage device in real-time. The device may further include a device for monitoring receipt of real-time audio and/or video data at the portable data storage device and notifying the receipt of the data to a user. Embodiments may also include a device for displaying video and/or text-based data to the user. The short-range wireless communication link may be a BlueTooth™ communication link.

There is also described herein a backup device for backing up data from a portable data storage device, the backup device comprising: a short-range wireless communication link; an interface for communicating periodically or quasi-continuously with the portable data storage device over the wireless communication link to back up data comprising a first data type; an interface for communicating at a predetermined rate of recurrence to back up data comprising a second data type; storage for storing the data obtained.

There is also described herein a portable data storage device comprising: a short-range wireless communication link for communicating with a backup device; a storage device for storing data of a first data type and data of a second data type; an interface for communicating periodically or quasi-continuously over the short-range wireless communication link to back up data of the first data type at the backup device; an interface for communicating at a predetermined rate of recurrence over the short-range wireless communication link to back up data of the second data type at the backup device.

The invention extends to apparatus embodying the invention, to a computer program or computer program product or signal embodying the method, to a data storage device configured to operate with such a backup device.

An embodiment of the invention will now be described by way of example only with reference to the accompanying drawings in which:—

Figure 1:
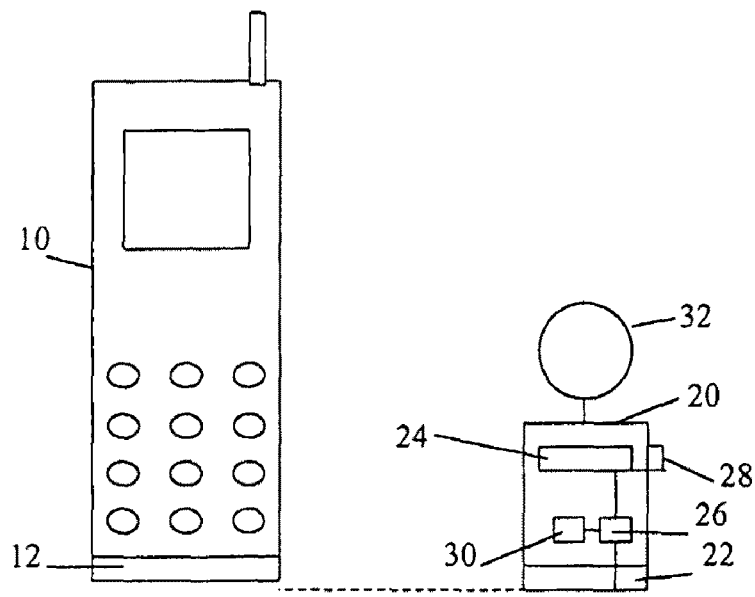
FIG. 1 shows a system in accordance with a first embodiment.

Referring to FIG. 1, a portable data storage device 10, in this embodiment in the form of a mobile telephone, includes a short-range wireless communication interface 12, in this embodiment in the form of a Bluetooth® transceiver chip. Although the transceiver is shown visible at the base of the device, typically it may be integrated within the device, or provided as an additional component integrated with a battery for the device or within the battery housing. The device 10 stores contact details and optionally appointments or other data within the body of the device or on a SIM card provided with the device and a processor within the device 10 communicates with the communication interface.

A backup device 20 has a short-range wireless communication interface 22, in this embodiment in the form of a Bluetooth® transceiver chip. An internal or external antenna may be provided, optionally on a circuit board. The backup device includes backup data storage 24, for example FLASH memory. The amount of memory may be as little as 1 Kb, for example to backup only key data but will typically be at least 64 Kbytes. Often considerably more memory, for example of the order of 1 Mb to 10 Mb and sometimes as much as 128 Mb or even more may be provided, depending on the capacity of the device 10. A processor 26 controls the operation of the backup device, specifically controlling communication via the interface 22 and storage of data, and also receives a user input 28 and controls an alarm device 30, for example a piezo electric sounder. A battery (not shown) is also provided within the housing (although the device may in some cases be powered by the transmissions from the portable data storage device). The alarm device may include a visible alert or a vibrating alert device. The user input 28 is preferably a simple input device, for example a single input button or a few buttons. A useful minimum function to implement with the user input device is cancelling of an alarm; other functions may be implemented by controlling the device via the communication interface. However, a more complex user interface may be provided, for example a voice recognition interface. The user interface may be omitted entirely; in such a case the alarm is preferably arranged to silence automatically after a predetermined time.

The backup device is provided in a convenient housing, here in the form of a key fob having a key ring 32 attached so that the device can conveniently be carried and is unlikely to be lost.

The device 20 may be attachable to or woven into an article of clothing. Alternatively or additionally, the device 20 may be integrated with or arranged to communicate with an item of "smart" clothing, that is clothing with some processing and memory function built in and optionally some human interface. The device may be provided as an application for an article of "smart" clothing.

In operation, software, for example stored within the main body of the portable data storage device 10, in the communication interface or on the SIM card, causes the processor of the portable data storage device to communicate with the communication interface to operate a data synchronisation algorithm over the interface with the backup device 20. Data synchronisation algorithms are well-known; in the present case a simplified, predominantly one-way, synchronisation algorithm may be employed as the data will not be changed by the backup device. Thus synchronisation may simply comprise updating the backup device with the contents of the portable data storage device at intervals, unless a "restore" sequence is invoked.

A single backup device may be employed to backup data, or detect loss, of more than one portable data storage device 10, for example a mobile telephone and a PDA may both be backed up to the same backup device. Furthermore, in such a case the data backed up may be independently stored or mutual synchronisation between all such devices may be performed for some or all of the data. For example, a PDA may back up contact, appointment and memo data and a mobile phone may back up only telephone number data; the telephone number data may be synchronised between the devices, or may be stored independently on the backup device.

The backup device may include other functionality, for example it may communicate with another network, for example a network for communicating positional information such as Geo Fencing application network. In such a case, the backup device may provide some of the functionality which might otherwise (or additionally) be provided by the portable data storage device. In particular, a user's position may be communicated using the backup device alone, for example if the portable data storage device is switched off.

The backup device may also be used in conjunction with a telemetry or telematics application, for example in which information is gathered by the device using the communication interface from other devices which pass into communication and is communicated to a central server.

The backup device may include yet other functionality, for example it may act as a key to a lock or alarm (for example for a vehicle, workplace or residence, other computing device or other resource); this may be achieved efficiently by making use of the communication interface. The device may include other "smartcard" functionality, optionally over the communication interface.

Figure 2:
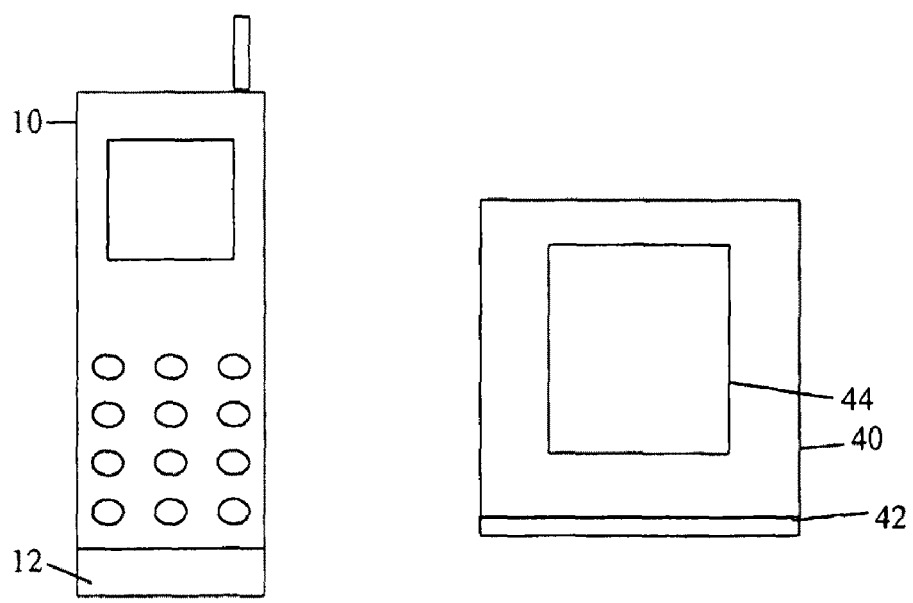
FIG. 2 shows a system in accordance with a second embodiment.

Referring to FIG. 2, an alternative embodiment provides the functionality of the backup device in a further portable data storage device 40, such as a handheld organiser. The further device 40 has a further communication interface 42, such as a Bluetooth® interface and has a touch screen for user input and output. The device 40 also includes a sounder, a processor and storage for data and for at least one application program, not shown. An application is downloaded to the portable data storage device 40 to communicate with the portable data storage device 10 and to provide a data synchronisation function. If the communication link is broken, an alert is sounded, preferably on both devices 10, 40. Furthermore, in the absence of a communication link, preferably at least one function of at least one device is inhibited or the device is switched into a "lost" mode displaying owner contact data.

The further portable data storage device 40 may allow input of data into the first portable data storage device 10. Data may be input into the further portable data storage device 40, for example using a keyboard, voice recognition software, or a handwriting recognition interface, for subsequent transfer into the first portable data storage device 10.

In one embodiment, the portable data storage device 10, 40, such as either of those shown in FIG. 1 or FIG. 2, may contain data such as the medical or dental records of the owner of the portable data storage device.

The following pseudo code explains the normal operation of the system:—
Portable Data Storage Device 10
  Every [period, e.g. 1 second]:—
  Attempt communication with backup device 20
  If successful, transmit update information if required
  If unsuccessful activate PDS Alert procedure:—
Backup Device 20
  Every [period, e.g. 1 second]:—
  Attempt communication with PDS device 10
  If successful, receive update information if required
  If unsuccessful, sound alarm for period or until cancelled
  A typical PDS Alert procedure for the Device 10 may comprise:—
  Sound alarm for set period
  Display "lost"
  Disable calls except to designated retrieval number
  In addition, procedures are provided:—
(1) To register the backup and portable data storage devices with each other
(2) To transfer data from the backup device to the portable data storage device or to a replacement portable data storage device following loss of data.

Further alert procedures that may also be triggered by the separation of the portable data storage device 10 and the backup device 20 include those outlined below.

The portable data storage device 10 may alert a network to which it is connected. For example, a mobile telephone may send a Short Message Service (SMS) message to a controller within the mobile telephone network. This may allow the mobile telephone to be disabled by the network. A user may then be required to contact the network operator before use of the mobile telephone may be facilitated. Alternatively, an SMS message may be sent to the owner of the portable data storage device.

In an alternative alert procedure, the portable data storage device 10, in this case a mobile telephone, may connect to a central network control centre. This may occur automatically when the alert procedure is triggered, or the mobile telephone handset may enter an operational mode wherein a user is required to telephone a central network control centre before the handset may be used again. The central network control centre may require information, such as a code or a password, before the alert procedure may be exited and before further use of the handset is permitted.

According to a further alert procedure, the portable data storage device 10 may display a message, which may include text or graphics, to indicate that the device has been lost or stolen. This message may include, for example, details of how to return the portable data storage device 10 to its owner, or an identifier by which the police may identify the owner of the device. A password or code may be required to exit the alert procedure mode and remove the displayed message.

A further alert procedure may cause the portable data storage device 10 to emit an audible tone (in addition to or instead of the tone produced by the backup device 20). If the portable data storage device is a mobile telephone handset, then the audible tone may be a ring tone, which may be a specific ring tone to indicate that the handset has been lost or stolen. As for the previous alert procedure, a code or password may be required to stop the emission of the audible tone.

In a final alert procedure, the portable data storage device 10 may pass data to a network when the alert procedure is triggered. The network may be a control network over which the data may be passed to a central control centre. The data passed to the network may include, for example, location information for the portable data storage device 10 (which may be implemented if the portable data storage device 10 has Global Positioning System (GPS) capabilities). The data may also incorporate information about the owner of the portable data storage device, which may, for example, allow the owner to be informed of the loss of the device and reunited with the device if it is subsequently located. Further, the data may comprise a unique identifier of the portable data storage device, for example the Bluetooth® serial number of the portable data storage device.

The alert procedures outlined above may be implemented individually, or a combination of the alert procedures may be used to increase security and the likelihood of the portable data storage device being returned to its owner after loss or theft. Each of the alert procedures may be implemented only after an initial delay and a number of alert procedures may each be implemented after a different initial delay. For example, an audible or visible alarm could operate at the backup device 20 immediately after initiation of the alert procedure, and the portable data storage device 10 could implement a further procedure, for example telephoning a central network control centre, after a preset delay period, for example an hour, if the alert procedure has not been aborted during this period.

It may be noted that any of the embodiments outlined above may be implemented in a two-way, symmetrical mode of operation. For example, the portable data storage device may also alert the user if the backup device is lost or stolen.

Furthermore, the backup and communication procedures between the portable data storage device 10, 40 and the backup device 20 outlined above may be initiated automatically when the devices come into range of each other. Alternatively, the procedures may be initiated at the request of the user, or only when the portable data storage device is put into a particular mode of operation.

It may also be noted that the backup device may provide output means, for example a screen or means for outputting data to a further device such as a computer, on which the data backed up from the portable data storage device may be displayed. This may allow the data to be accessed even when the portable data storage device itself is unavailable. For example, backed up address book data may be accessed on the backup device when the portable data storage device is unavailable, for example if the portable data storage device has been lost or is being used to make a telephone call.

A further embodiment will now be described with reference to FIG. 3 in which a plurality of tagging units 54, 56, 58 may be provided to communicate with a central control unit 50. The central control unit 50 may comprise the same functionality as each of the tagging units 54, 56, 58, but, in a preferred embodiment, the central control unit 50 comprises additional functionality, as described below.

In this embodiment, the central control unit 50 communicates periodically with the tagging units 54, 56, 58, as described above for FIG. 1. The central control unit 50 further comprises display means 52, for example a screen, via which the owner of the central control unit 50 may obtain information. This information may comprise, for example, the time at which each of the tagging units 54, 56, 58 was last contacted by the central control unit 50, or the distance between the central control unit 50 and each of the tagging units 54, 56, 58.

Figure 3:
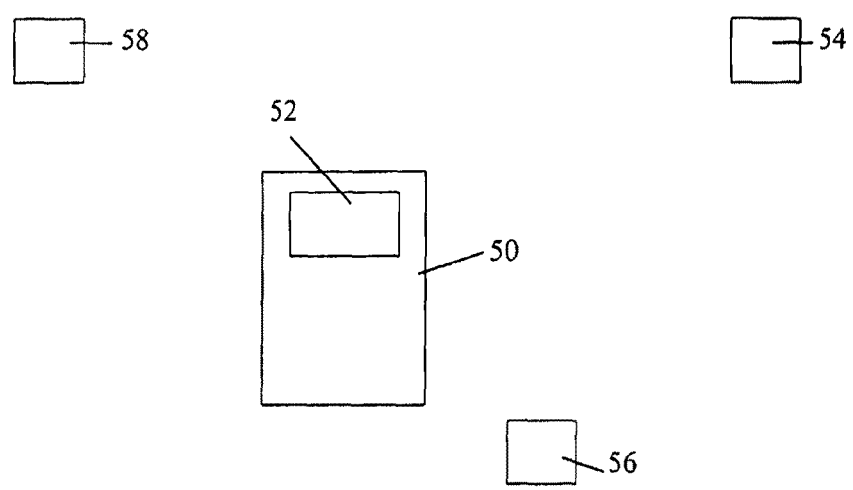
FIG. 3 shows a system in accordance with a third embodiment.

According to one embodiment, the central control unit 50 of FIG. 3 may be used by a parent or adult to monitor the movements of children, each of whom have been given a tagging unit 54, 56, 58. The central control unit 50 may implement an alert procedure, such as one of the procedures outlined above if the tagging device 54 belonging to a particular child moves beyond a predefined range. Different ranges may be set for different tagging devices and an alert procedure may involve notification of both the central control unit 50 operator (the parent) and the tagging device holder (the child). The alert procedure may comprise, for example, the central control unit 50 displaying a picture of the child who holds the tagging unit 54 that has moved out of range. This picture may then be used by the parent, for example to aid security guards or the police in identifying the child more easily. The alert procedure may also comprise an audible warning being emitted by the tagging device 54 to aid retrieval of the child.

In one embodiment, the central control unit 50 may be the mobile telephone handset belonging to the parent.

Figure 4A:
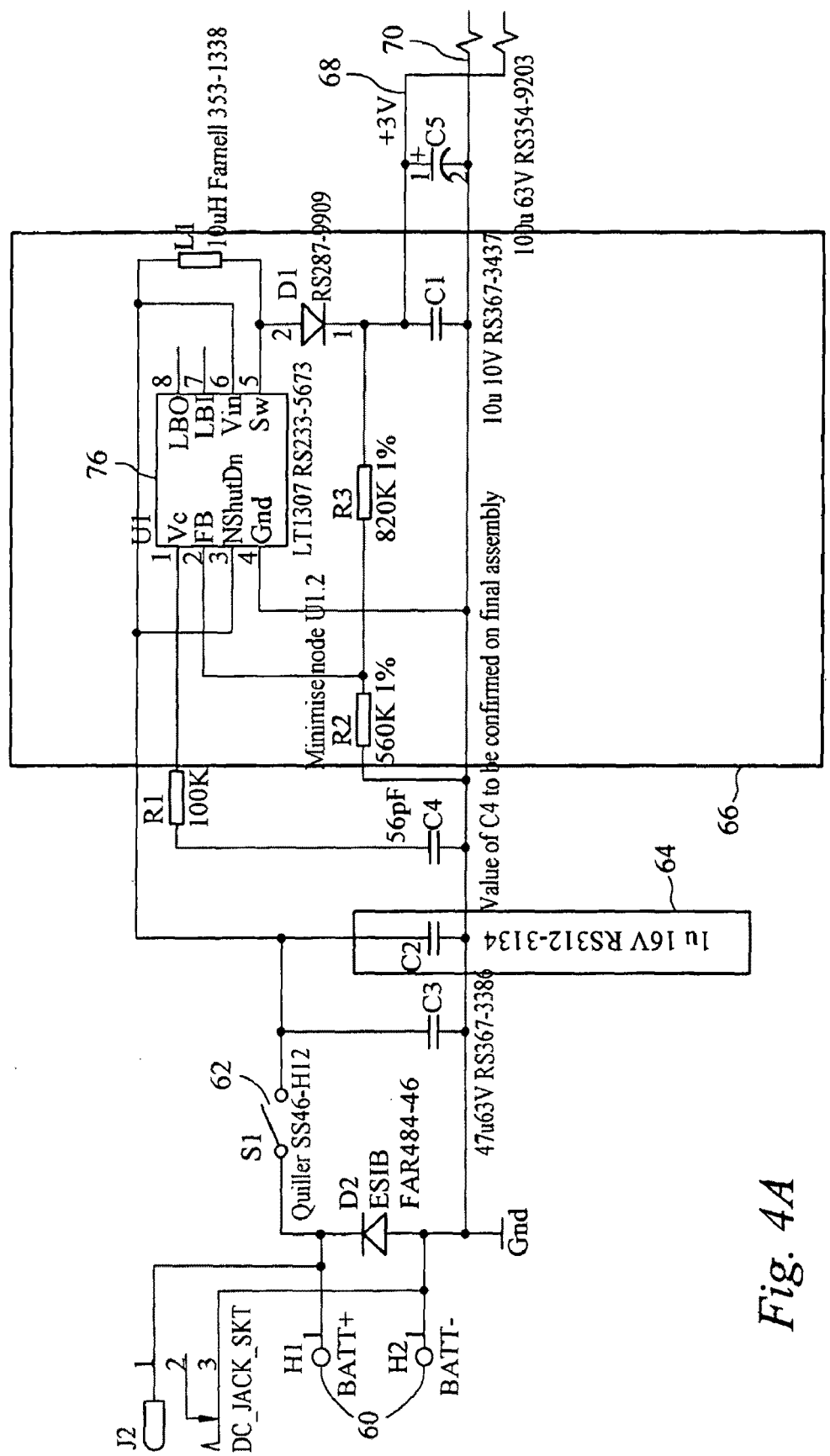
FIGS. 4a and 4b show two halves of a circuit diagram according to which one embodiment of the backup device may be implemented.
Figure 4B:
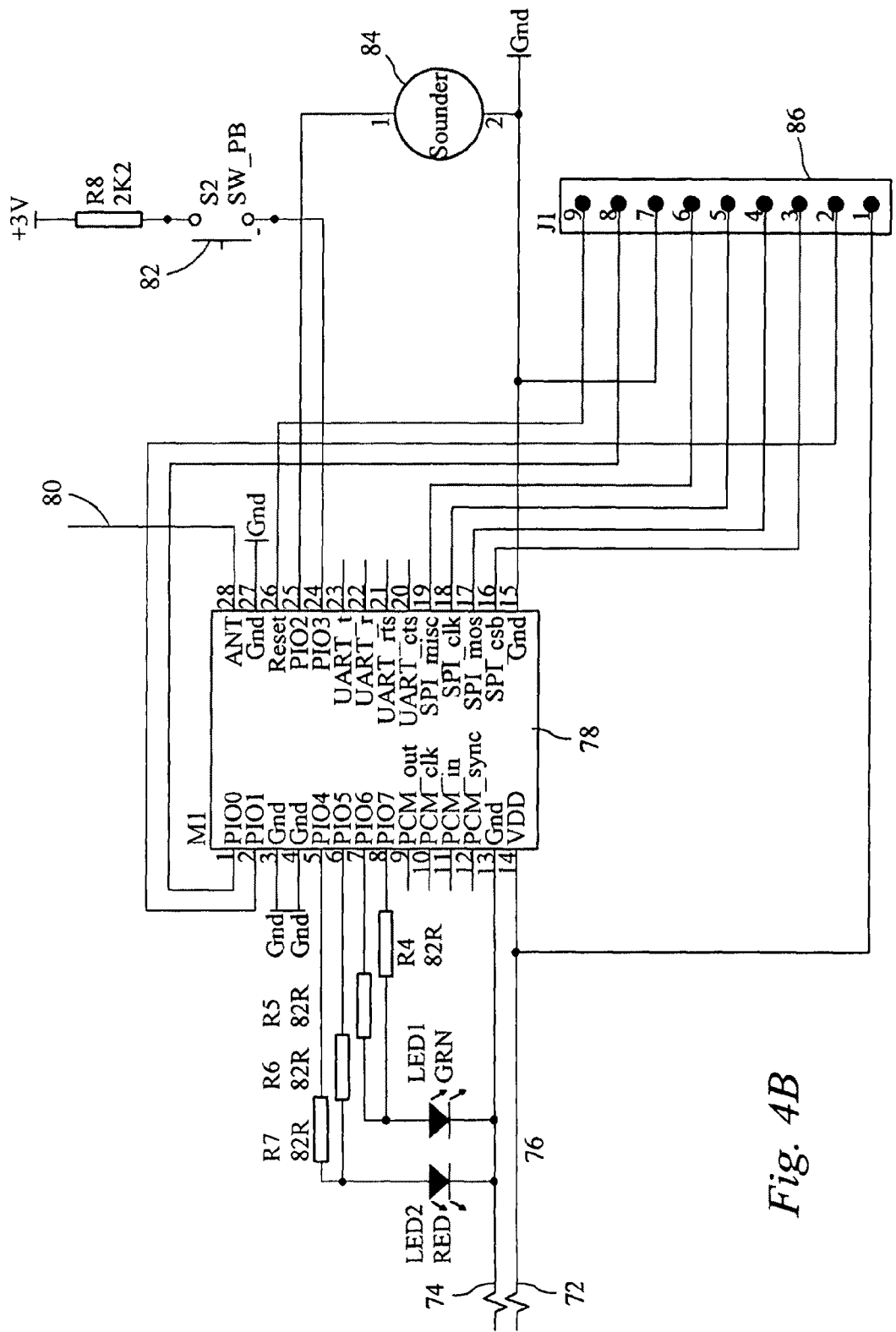

FIGS. 4a and 4b illustrate two halves of a circuit layout of the backup device according to one embodiment of the present invention. This layout is shown by way of example only and modifications may be provided or alternative or additional components may be substituted for those shown.

With reference to FIG. 4a, in this embodiment, a dry cell or rechargeable battery 60 may be used to provide the power supply. An on/off switch 62, shown here as a slider switch, may be provided. In this embodiment, maximum width tracks are used for all battery connections outside the psu room to maximise the ground plane for all psu components and the battery. RF style tracking (max width and short) may be provided (part of psu room). Further, a switchmode regulator 76 may ensure that the BlueCore supply is maintained at 3.0+−0.1 Volts.

The circuit of FIG. 4a continues in FIG. 4b, with points 68 and 70 connecting to points 72 and 74 respectively. Paired outputs 76 may each source 4ma. In this embodiment, a Mitsumi WML-C06NH integrated circuit 78 is used as an integrated Bluetooth® transceiver and microprocessor running a stored program to implement the software, but other devices may also be suitable and may provide the same or similar functionality. An antenna 80, a push button 82, a sounder 84 (in this case a Piezo Sounder) and a 9-way header 86 may also be provided.

One embodiment of the system will now be described in more detail with reference to FIG. 5. In one embodiment, the backup device 210 may act as a remote access device or hands-free device for the portable data storage device 212 via the BlueTooth™ link. For example, the backup device may incorporate a microphone 214 and speaker 216. Incoming calls may be answered or diverted to an answerphone via buttons 222 provided on the backup device. Buttons provided on the device may be back-lit for easy visibility in low lighting conditions. If the call is answered, incoming audio may be routed over the BlueTooth™ interface and output via the speaker 216. Audio may also be collected by the microphone 214 and relayed to the portable data storage device 212.

The hands-free aspects of the operation of the backup device may be provided independently of the aspects relating to backing up data from the portable data storage device. That is, the backup device may act only as a hands-free or remote access device for the portable data storage device without providing any data backup capabilities. Alternatively the backup device may only back up data relevant to its functionality as a hands-free device. For example, the backup device may maintain a record of telephone calls routed through the backup device or the backup device may store a copy of the directory information from the portable data storage device to enable a user to use, edit or view the information at the backup device.

In one embodiment, the data backup device 210 may further be provided with a screen 220, preferably a small screen, which may be used to display messages, such as SMS text messages or MMS messages, received at the portable data storage device 212.

In this embodiment, the backup device 210 may be provided with means for attaching the device to the user. For example, the backup device may be implemented as a pin, badge or broach, which may be pinned to the user's clothing. Alternatively, the device may be integrated into an item of the user's clothing or an accessory, such as a watch or jewellery. In one embodiment, the backup device may be provided with a strap or necklace to enable the backup device to be worn around the neck of the user.

In an alternative embodiment, the backup device may incorporate a large screen and camera to enable the backup device to be used as a remote, hands-free video-calling device. This embodiment may also enable the user to view or create multimedia messages or video content on the backup device.

A further feature of the backup device may be the capability to receive and respond to audio commands. For example, if incoming telephone calls are routed from the portable data storage device to the backup device, they may be answered by the user using an audio command spoken to the backup device. Further, outgoing calls may be made to a selected recipient via the backup device using an audio command (such as the name of the recipient) spoken to the backup device. This may enable the backup device to provide truly hands-free remote access and control of the portable data storage device.

Figure 5:
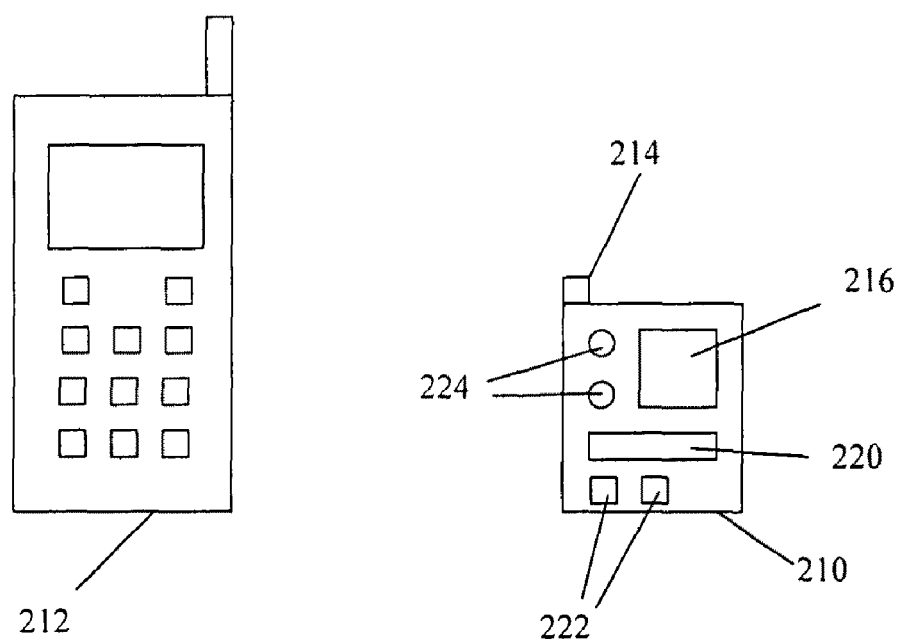
FIG. 5 is a schematic diagram of a further embodiment incorporating a hands-free communication device.
Figure 6E:
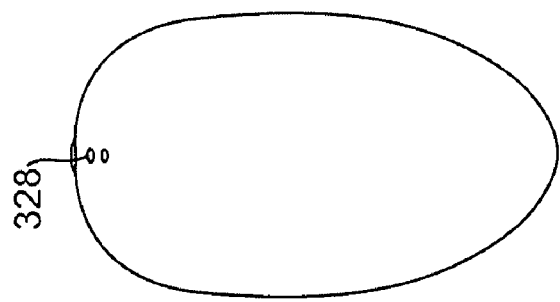
FIGS. 6a to 6e illustrate views of a further embodiment of a device as described herein.
Figure 6D:
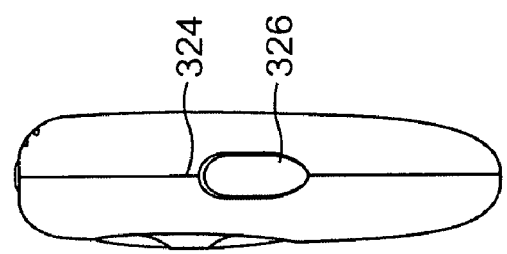
Figure 6A:
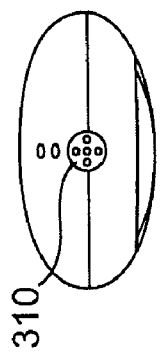
Figure 6C:
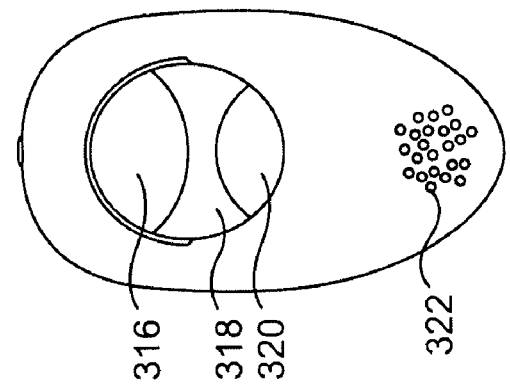
Figure 6B:
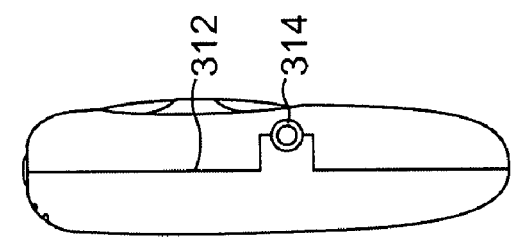

As illustrated in FIG. 5, the backup device preferably further comprises one or more light emitting diodes (LEDs) 224. Two mutually distinguishable LEDs may be provided on the outside of the backup device. These LEDs may be used to indicate the status of the backup device, for example a red flashing LED may be used to indicate that the backup device is in an alert status and a blue flashing LED may indicate that the backup device is receiving data from the portable data storage device. A further LED or other light source may be provided as a back-light for a screen provided on the backup device. Alternatively a single multicolour, for example tri-colour, LED may be provided to identify different modes and conditions of the backup device to the user.

A further embodiment of a hands-free and/or data backup device is illustrated in FIG. 6, in which various features that may be provided with embodiments of the device are highlighted. It will be appreciated by one skilled in the art that not all of the features illustrated in the embodiment of FIG. 6 may be provided in every implementation of the system described herein. However, the system may incorporate a microphone 310, optionally with an auxiliary microphone hole 312, a DC jack 314, a power button 316 which may incorporate a back-lit icon, a tri-colour LED 318, a function button 320 which may include a back-lit icon, speaker holes 322, volume up/down buttons 324, 326 and provision for a neck strap 328, key ring or other attachment means.

The dimensions of the hands-free or backup device described herein are preferably such that it is easily carried by a user, for example in a pocket or around the user's neck. A typical device may have a length of greater than 50 mm, but less than around 90 mm, preferably around 75 mm, a width of less than 50 mm, preferably around 40 mm and a depth of less than 25 mm, preferably around 20 mm. This may allow the device to sit easily within the palm of a user. Embodiments of the device may be shaped ergonomically to enable the device to be easy to use, preferably by a user using only one hand.

It is clear to one skilled in the art that the many different designs of the device described herein may be implemented and the claimed invention is not limited to any particular design.

Embodiments of systems and methods for backing up data using the backup device described above will now be set out in more detail.

In one embodiment, the portable data storage device from which data is backed up by the backup device may comprise a mobile telephone. A wide variety of data may be stored by the mobile telephone, which may include but is not limited to directory data (e.g. contact details, in particular telephone numbers), short message format messages (SMS), multimedia format messages (MMS), image data (e.g. from a built-in camera), video data (e.g. downloaded video clips), audio data (e.g. music, ring tones), calendar, reminder, alarm and task information, data files, operational data generated by the mobile telephone (e.g. call records and billing information), applications (such as tools and games) and personal configuration information for the storage device.

As will be appreciated, this data may be stored in a large number of different file formats, the files varying greatly in size. The frequency at which the data in the files changes and is updated also varies between the data. For example, the audio and video data may change only infrequently, whereas operational data and SMS and MMS data is likely to change each day.

Some or all of the data listed above may be backed up over a wireless link, preferably a BlueTooth™ link, to the backup device described above. As described in more detail below, different backup cycles may be used to back up different classifications of data.

The data types listed may be classified into one of a number of predetermined data classifications. For example, one data classification may be "critical and volatile data", which may include data that is both important and that changes rapidly over time, such as operational data and calendar, reminder, alarm and task data. A further data classification may be "critical stable data", which may include directory data, data files and personal configuration information. Other data classifications may include "volatile but non-critical" data, which may include SMS and MMS message data and "stable non-critical data", which may include video, audio and image data.

The data typically found on a portable data storage device may be pre-classified into default data classifications by the supplier of the backup device or the portable data storage device. Preferably, however, the user can define or redefine at least some of the data classifications. For example, if data files on the portable data storage device are important to a user and often amended, this data type may be reclassified by the user as "critical and volatile data", whereas, if the user does not use the calendar function on the portable data storage device, this data type could be classified as "stable non-critical" data. In one embodiment, the different types of data may not be pre-classified and the user may classify each type of data into one of a plurality of data classifications.

As a further, highly preferable feature, individual items of data (for example a particular video data file or image data file) may be classified as a particular data classification. This may be done by setting a flag associated with the data item.

Classification of the data, or amendment of the pre-set data classifications, is preferably undertaken by the user using a user interface, preferably a graphical user interface. The graphical user interface may be provided at the portable data storage device, for example as a software application implemented on the portable data storage device. Alternatively, a user interface may be provided on the backup device either directly, for example via a screen on the backup device, or via a connection to a remote terminal, such as a personal computer. In an alternative embodiment, a user interface may be implemented as a software application on a computer and data entered into the application may be copied to the backup device and/or the portable data storage device.

Data items or data types may also classified into a "do not backup" data classification. For example, the user may not wish to have SMS or audio data backed up to the backup device.

Different backup cycles may be implemented for different classifications of data. For example, critical and volatile data may be backed up to the backup device periodically or quasi-continuously over an always-connected or frequently-connected link between the portable data storage device and the backup device. Hence, data such as reminder and calendar data or operational data may be backed up in a quasi-continuous manner.

Depending on the speed of the data transfer link to the backup device and the amount of data, critical stable data may also be backed up periodically or quasi-continuously to the backup device. Alternatively, critical stable data may be backed up regularly, but not continuously, to the backup device. For example, this classification of data may be transferred twice a day or once an hour to the backup device. Similarly, depending on the speed of the link and the amount of data, non-critical volatile data may be backed up in a regular, but not continuous cycle. Non-critical, stable data may be backed up to the backup device in a less frequent cycle, for example once a day or once a week.

In a preferred embodiment, some data classifications, in particular non-critical, stable data, may be backed up only when the system is not performing any other tasks. For example, the data may be backed up when the level of activity of the processor of the portable data storage device has been below a predetermined threshold for a predefined length of time. This may enable the less critical data to be backed up only when the portable data storage device and backup device are not otherwise being used, for example to make a telephone call or process data. For example, the less critical data may be backed up at night.

On backup of the data from the portable data storage device, the data may be converted to a different format for storage at the backup device. Conversion of the data may take place at the backup device itself or, preferably, at the portable data storage device before transfer to the backup device.

At least some categories of data may also be compressed for storage at the backup device. Again, the compression may take place at the backup device, but preferably is performed at the portable data storage device before transfer of the data.

In one specific example, stable memory (e.g. internal Flash memory or electrically erasable programmable read-only memory (EEPROM)) may be provided at the backup device for at least 500 contacts. Each contact entry may include some or all of the information set out in the table below:

| Identifier No. | Phonebook Entry | Size (Bytes) |
| --- | --- | --- |
| 1 | First name | 25 |
| 2 | Last name | 25 |
| 3 | Company | 25 |
| 4 | Job title | 15 |
| 5 | Home telephone | 16 |
| 6 | Office telephone | 16 |
| 7 | Mobile | 16 |
| 8 | Video call | 16 |
| 9 | Fax | 16 |
| 10 | E-mail | 50 |
| 11 | User ID | 25 |
| 12 | Total | 245 Bytes |

In a further embodiment, which may be implemented in conjunction with or independently of the data backup system described above, the backup device may be used as a data transfer device.

Data may be transferred from the portable data storage device to the backup device over a short-range wireless link, such as a BlueTooth™ link. The data stored in the backup device may then be transferred to a third device, such as a computer.

Transfer of data from the backup device to the third device may take place over the short-range wireless link, for example a BlueTooth™ link. However, preferably, the backup device is provided with one or more of a plurality of different types of interfaces for connecting to the third device. Interfaces may include, but are not limited to, USB and FireWire. Alternatively, or in addition, the backup device may be provided with a card slot for reading and/or writing to a memory card to allow data received from the portable data storage device to be transferred to a third device via the memory card. For example, the backup device may be provided with a slot for a USB card or device, a Flash or Compactflash memory card, a Secure Data (SD) card, a Smartmedia card, a Memory Stick (MS), an XD card or a Multimedia Card (MMC).

As described above, the data format may be converted on transfer of the data to the backup device. Hence, data stored in the portable data storage device may be transferred to the third device, via the backup device, in a format suitable for the third device.

In some embodiments, the data transfer system described above may be provided as a two-way system. That is, data may also be transferred from the third device to the portable data storage device via the backup device.

The data that is transferred to the third device may be selected automatically by the system, based on the data type (for example, all calendar data or all picture files) or may be selected by the user, at the portable data storage device, the backup device or the third device.

For example, in one embodiment, the portable data storage device may comprise a mobile telephone incorporating a camera with image-capture capabilities. Images taken with the camera may be stored in the memory of the telephone and communicated to the backup device over a BlueTooth™ link according to a predetermined backup procedure. Using the backup device, the image may then be transferred to a third device, such as a printer or a computer via a direct connection, such as a USB connection, or by transferring the image onto a data card, such as a Compactflash card, which may then be inserted into the computer or printer. The image may be converted from one file format (e.g. from RAW or TIFF) to another file format (e.g. JPEG) on transfer between the mobile telephone and the printer or computer.

The third device may also comprise a further portable data storage device, such as a second mobile telephone. Hence the backup device may be used to transfer data between mobile telephones.

In one, specific embodiment, the backup device is provided with a slot for an SD card. Data from the portable data storage device is backed up to an SD card within the backup device over a BlueTooth™ interface. Once the SD card in the backup device has been filled with data, it may be removed from the backup device for storage and a new card may be added to the backup device. Data transferred to the SD card may be deleted from the portable data storage device or may be marked as "backed up" data to indicate that it does not require further backup in any subsequent synchronisation of the backup device and the portable data storage device.

In a further embodiment, the backup device described herein may be used as a transaction logging device. This aspect of the system may be implemented independently of or in conjunction with the systems and methods described herein.

In one embodiment, the portable data storage device may comprise a mobile telephone. The backup device may back up operational data, for example call data records, from the mobile telephone to maintain a list of called numbers or received numbers and the time of duration of the calls. This may enable the owner of the mobile telephone (for example a company whose employee uses the telephone) to monitor calls being made from the telephone. The backup device may initiate an alert procedure (for example transferring data over a network to a computer) on detection of a predetermined number or type of number (for example an international telephone number).

In a further embodiment, the backup device may be supplied with a list of numbers, or types of numbers, that the mobile telephone is permitted to access. The mobile telephone may seek permission from the backup device before making or receiving a telephone call and the backup device may block or permit access to the requested number.

Similarly, the backup device may be used to monitor and control access to services by other types of data storage devices. For example, the backup device may monitor access to the internet by a portable data assistant (PDA) or a laptop computer or PC. Details of requested domain names or IP address may be transmitted to the backup device for storage and possible onward transmission. This may enable a third party, for example the parent of a child, to monitor and control access to services such as the internet.

In a further, related embodiment, the backup device may be used to create and store a record of transactions made by a portable data storage device. For example, details of transactions such as financial transactions may be backed up to the backup device and stored for later retrieval or transfer to a third party device.

In one particular embodiment, the portable data storage device may be credited it a number of credits for use in buying small items, such as newspapers and drinks. Each transaction in which an item is purchased reduces the number of credits in the device. Details of these transactions may be stored in the backup device to allow a user to maintain a complete record of transactions and, in some embodiments, to allow a third party to access to transaction records to enable billing of the user or payment of the merchant from whom the item was purchased.

A further embodiment of the system described herein is set out below with reference to FIG. 7. Features of this embodiment may be implemented in conjunction with other features or embodiments of the system described herein.

As set out above, in one embodiment, the backup, hands-free or communication device, which will be referred to in this embodiment as the secondary device, may be arranged to receive text (or other data, MMS, audio or voicemail) messages from the portable data storage device. Such messages may be displayed to the user via visual means or relayed to the user via audio. For example, the secondary device may include text-to-speech software to translate written data into an audio message.

As set out above, the portable data storage device, which will be referred to in this embodiment as the primary device, has data storage and long range communication capabilities and may comprise a mobile telephone or personal digital assistant (PDA).

Alternatively, or in addition, the secondary device may enable the creation and sending of new text, data or MMS messages. For the example of text messages, FIG. 7 sets out in more detail one embodiment of the process of creating and sending a text message using the secondary device.

A command, preferably a voice command, to create a new text message is received at the secondary device from a user 410. The text creation application is started at the secondary device 412. This application includes voice-to-text recognition software, which receives audio from a user 414 and converts it to text data in the secondary device 416. The text is then inserted into the payload of a text message.

Optionally, the text created by the secondary device from the audio data may be relayed to the user 418, for example the text data may be read back to the user via a text-to-speech application. The user may preselect, via a setting on the secondary device, whether the text message sending process should include this step. If the text data is relayed to the user 418, the user may verify that the text data is correct 420, preferably via a voice command. If corrections to the text are needed, the user may submit further audio input to the secondary device 414, a new message may be created 416 and the user may re-verify the amended text data 418.

Once the user is satisfied with the text output, a destination identifier may be obtained from the user 422 and the identifier may be associated with the text data by formatting the text data and the destination identifier as a text message 424. The destination identifier may be a numeric identifier of the intended recipient for the message (e.g. the IMEI number of the recipient's mobile telephone) or may be received in the form of an audio identifier (for example the name of the recipient), which may be translated into a numerical destination at the secondary device or the portable data storage device.

The text data and its associated destination identifier may then be transmitted from the secondary device to the portable data storage device over the short range wireless communication link (e.g. BlueTooth™) 426.

Figure 7:
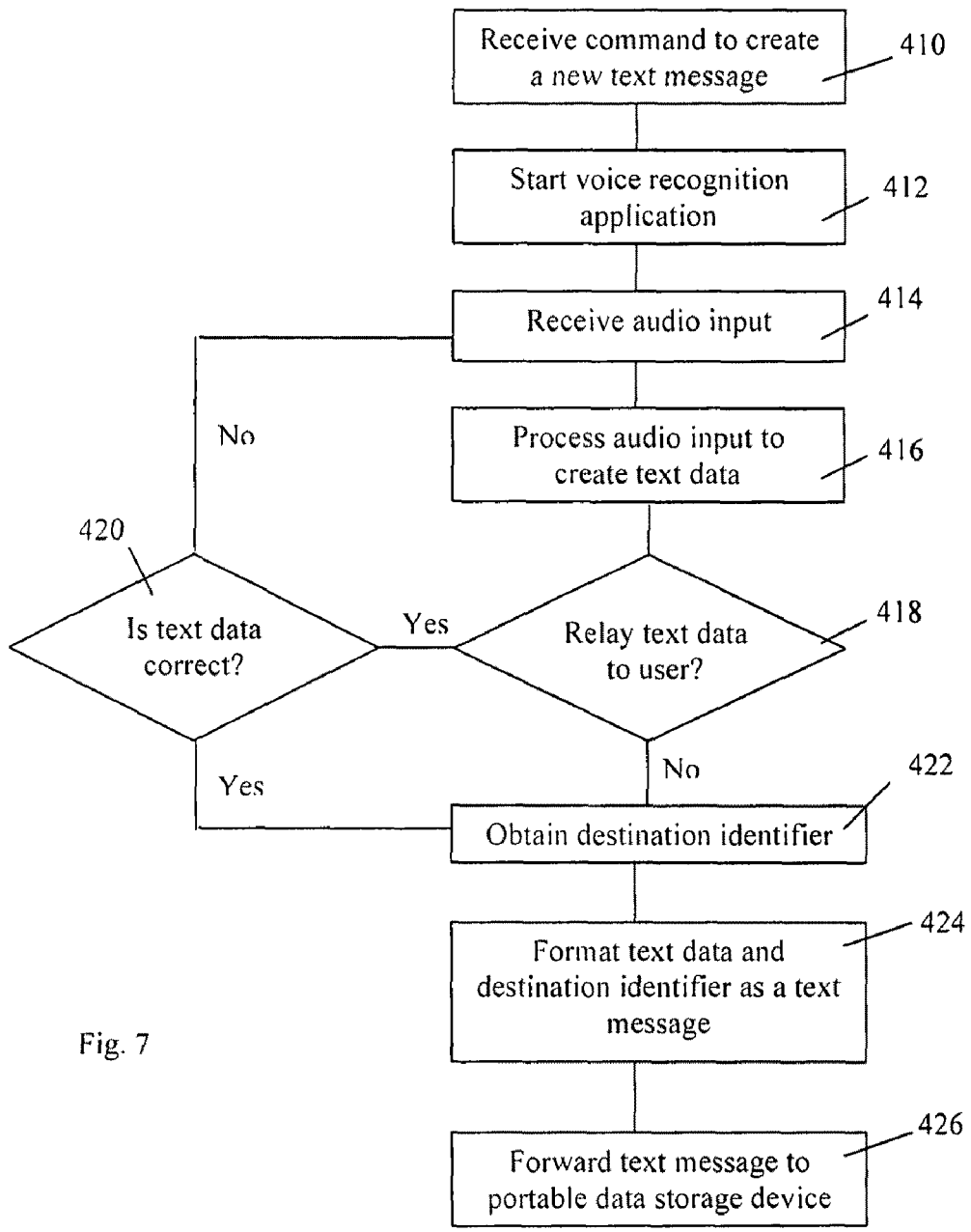
FIG. 7 is a schematic diagram of a method of operating the secondary communication device in conjunction with the primary portable data storage device according to one embodiment.

It will be appreciated by one skilled in the art that steps of the process detailed in FIG. 7 may be omitted as appropriate or further steps may be added. Further, the steps may be implemented in a different order to that illustrated (for example, the step of obtaining the destination identifier 422 may be undertaken before the audio input for the text message is received 414).

Further steps in the process, not illustrated in FIG. 7, may include the receipt of messages from the portable data storage device confirming the sending or receipt of the text message. Such confirmation messages may be relayed to the user via audio and/or visual means.

A software application may be provided on the portable data storage device to enable the device to operate in conjunction with the text creation application of the secondary device. However, preferably, the secondary device interacts with the portable data storage device over the BlueTooth™ interface to send messages from the portable data storage device without the need for additional software. For example, the secondary device may operate the portable data storage device to send a text message in an equivalent way to which a user would send a text message directly.

In an alternative embodiment, rather than the processing of the audio data being performed at the secondary device, the audio data received at the secondary device may be relayed to the portable data storage device for voice-to-text recognition to turn the audio data into text data. Alternatively, the processing of the audio data may be distributed between the portable data storage device and the secondary device. For example, the secondary device may perform some pre-processing or partial processing of the audio data and the portable data storage device may complete the necessary processing. The processing at the two devices may be undertaken in series, with the secondary device forwarding the results of its processing to the portable data storage device, or the processing may be performed in parallel between the two devices over the short range wireless communication link. The location of the processing may depend on a preference set by the user or may depend on the type or content of the message being processed.

In one embodiment, as set out above, the voice-to-text recognition software may enable the recognition and sending of any text as a message. In an alternative embodiment, only certain, pre-prepared messages may be sent using voice commands. For example, a user may save pre-prepared text messages to a memory in the secondary device or certain common messages may be supplied with the secondary device. These messages may be selected at the secondary device, preferably using voice commands, and sent via the portable data storage device.

In the case of a multimedia format message, data or images (for example a business card) may be attached to the message, preferably via voice commands, before the message is transmitted to its destination. In one embodiment, such attachments may be sent without adding text data to the message or with a pre-prepared section of text, for example the signature of the user.

The audio recognition functionality described above may also be used to enable the user to create data entries for the portable data storage device, for example calendar or task entries that may be inserted into the portable data storage device or notes that may be stored as text files at the portable data storage device. In this case, the destination identifier for the message that is created may refer to a destination internal to the portable data storage device, for example "calendar" or "notes".

In one embodiment, the voice-to-text recognition software may be adaptive so that it may learn from the audio data it receives from the user and more accurately convert similar audio to the correct text data on subsequent receipt of the same audio data.

Preferably, the secondary device receives and converts audio data in the form of normal speech. However, for a secondary device with more limited processing power or specifications, the audio data may be received as single alpha-numeric characters or symbol commands, in a similar way to which messages are currently created by hand. The single characters may then be converted into fluent text data.

To preserve the limited space available in text messages, the secondary device may convert the audio data received into an abbreviated format consistent with that currently implemented in text messages. (For example converting "later" to "l8tr" and "See you at 5 pm" to "C U @ 5".)

It will be clear to one skilled in the art that variations may be provided to the system described above and further features may be implemented in conjunction with the system.

A further feature that may be implemented in conjunction with any of the systems described above is the immobilisation of the portable data storage device by the backup device. An immobilisation procedure may be implemented by the backup device and/or the portable data storage device on the loss of the communication link between the devices for a predetermined period. For example, the backup device may transmit an identifier of the portable data storage device to the telephone network on loss of the communication link. This may allow the telephone network to block usage of the portable data storage device at least temporarily.

Alternatively, or in addition, the portable data storage device may enter a locked mode on loss of the communication link to the backup device, in which some or all of the functionality of the portable data storage device is "locked" and unusable, preferably with the exception of being able to telephone emergency services. In a preferred embodiment, the portable data storage device become "unlocked" and fully usable if the backup device is brought back into communication range with the portable data storage device.

It will be clear to one skilled in the art that features of one embodiment described above may be implemented in conjunction with other embodiments. For example the data backup features in which different types of data are backed-up according to different backup cycles may be implemented in a device that also provides hands-free calling access to the portable data storage device.

In one embodiment, further functionality may be added to the backup device by downloading software applications to the backup device. For example, the immobilisation functionality described above may be added to the operation of the backup device by downloading appropriate software to the backup device or the portable data storage device. The software may be downloaded over a telephone network or another network, such as the internet, for example via a wireless broadband network.

The backup device may further be provided with a power source appropriate to its functionality. For example, a backup device that simply backs up data from the portable data storage device may be provided with a small battery, for example a pair of AAA-size batteries, which may be rechargeable or replaceable. A backup device that provides more functionality, such as the hands-free device, may be provided with a larger, preferably rechargeable, battery together with a charger or an attachable battery pack.

With regard to the design of the backup device itself, technical features which may be taken into consideration in the design include the following:

any buttons on the backup device should be robust and should be positioned so that they are not easily activated accidentally the buttons may be manufactured from metal or, preferably, plastic a multi-purpose housing facility may be provided for the attachment of, for example, a key ring or a neck strap or means for attaching the backup device to an accessory or article of clothing of a user, such as an integrated pin, may be provided a magnifying lens may be provided as part of the enclosure for the alarm LED the plastic from which the backup device is manufactured should be scratch-proof, suitable for heavy usage and pass a drop test of a few meters embodiments of the backup device may have dimensions of around 55 mm×28 mm×15 mm embodiments of the backup device may have a volume of around 25 cm$^3$ the backup device should be able to operate in a temperature range of around −20° C. to 55° C.

the speaker output may be grilled housing should be provided for the power source, for example two AAA batteries logos may be screen printed, engraved or moulded into the plastic casing Procedures may be provided to enable communication links to be set up and maintained between the portable data storage device and the backup device. In particular, procedures may be defined to enable the backup device to be coupled with a new portable data storage device, such as a new mobile telephone or to an existing portable data storage device, such as an old mobile telephone. Examples of such procedures are set out below for illustrative purposes only.

A procedure for coupling a new or an old backup device with a new or an old portable data storage device may include one or more of the following steps:

Power on the backup device, for example by pressing a power button for 1 to 3 seconds.

Put the backup device in pairing mode, e.g. by pressing a further button or keeping the power button pressed for a further length of time.

The backup device indicates that it is in pairing mode, e.g. by having an LED glowing continuously.

The backup device may stay in the pairing mode only for a predetermined length of time, e.g. 3 minutes, after which it may power down if a pairing attempt has not been made.

Start the pairing application on the portable data storage device.

'Discover' the backup device with the help of the user interface on the portable data storage device.

The application on the portable data storage device connects to the backup device with a known passkey, e.g. 4 digits long.

The backup device indicates completion of pairing, e.g. by an LED blinking twice.

The application on the portable data storage device may initiate synchronisation upon successful pairing and moves into a protected state, which may be indicated by a beep and/or flash (e.g. blinking an LED once every 5 seconds) on the backup device.

The backup device may further power down for 5 minutes in the event of 3 consecutive unsuccessful attempts to couple with the backup device.

An option to decouple the portable data storage device and backup device may be provided, for example by the entry of a passkey at the portable data storage device. Once the devices have been paired, the devices may couple automatically when they are switched on.

Further predefined procedures may be implemented between the portable data storage device and the backup device. For example, a manual synchronisation procedure may include one or more of the steps of:

Couple the portable data storage device with the backup device.

Select the application on the portable data storage device to start the manual synchronisation.

Display messages on the user interface of the portable data storage device relating to the progress and success of the ongoing synchronisation and indicate the completion of a synchronisation session.

Provide an option on the portable data storage device application to cancel the synchronisation session on request.

Prioritise GSM and hands-free events during a synchronisation session (with regard to both the processor of the portable data storage device and the communication link), even if the devices are in a protected state.

An automatic synchronisation procedure may further be defined, including one or more of the steps of:

Couple the portable data storage device with the backup device.

Initiate automatic synchronisation at the backup device on power on and at a predetermined time interval (e.g. once every 24 hrs) if the device is continuously on.

Prioritise GSM and hands-free events during an automatic synchronisation session, even if the devices are in a protected state.

If the portable data storage device is switched off, the backup device delays the automatic synchronisation by a predetermined length of time (e.g. 1 hr).

A user may further switch off beeping noises from the backup device by a predetermined procedure, e.g. by pressing the function button on the backup device or entering a passkey at the user interface of the portable data storage device.

If the portable data storage device and the backup device go out of range when coupled, the application on the portable data storage device may display a message to indicate immobilisation and the backup device may buzz, beep and/or flash to indicate immobilisation.

The portable data storage device may support a piconet to enable the immobilisation feature to be available when the device is used with a BlueTooth™ hands-free device. The application on the portable data storage device may ensure that priority is given to GSM and hands-free activities.

Data recovery and upload functionalities may be provided from the backup device in case of loss of the portable data storage device. An application may be provided on a PC which may operate over BlueTooth™ to synchronise the data from the backup device. Data recovery may also be provided with the help of a service centre, who may be able to authenticate genuine users and enable data recovery. The facility may be provided, for example on the portable data storage device application or a PC application, to clear the contents of the backup device.

When the portable data storage device is immobilised, it will preferably still be possible to make emergency telephone calls to a predetermined number. In one embodiment, incoming calls and messages are not disabled in the immobilisation mode. Immobilisation of the device is ensured even if the portable data storage device is powered off and back on after immobilisation.

The backup device may further include a low power or low battery warning, for example when the battery level falls to less than 5% of it's capacity. This may be implemented as a beep or flash and/or a low power message may be sent to the application on the portable data storage device, which may display a, preferably flashing, icon.

A SIM lock may also provided by the application on the portable data storage device to prevent unauthorised users accessing the SIM by other means.

Further features of the operation of one embodiment of the backup device are set out below by way of example. In this example, the portable data storage device is a mobile telephone.

With the backup device in a Power Down State both the red and blue LED will be OFF. Power ON the backup device by pressing Button 1 for more than 3 seconds. Power ON state is indicated by the Red LED blinking once in every 5 seconds. Keeping the Button 1 pressed for more than 6 sec will put the backup device into pairing mode. Pairing State is indicated by the solid glow of the Blue LED. The backup device will be in pairing mode for 3 minutes. During this period, it can be paired from the mobile phone.

If the backup device is already paired with a mobile, backup device will try to couple with the mobile phone. Upon successful coupling the blue LED on the backup device starts blinking once in every 5 sec, now the backup device is in protected state.

If the backup device is not paired with any mobile phone, the backup device will go to Power Down state after 10 seconds. If backup device fails to connect, it retries for 3 times and goes into Power Down state. While going to Power down state Red LED blinks 3 times with 1 sec delay.

In the Pairing State, this is indicated by the solid glow of the Blue LED. In Pairing mode the backup device responds to a pairing request. Upon successful pairing, backup device enters the Protected state, which is indicated by Blue LED blinking once in every 5 seconds. If the other side provides a wrong passkey 3 times during pairing, the backup device will go into Power Down state for 5 mins. The backup device will be in pairing mode only for 3 mins. If there is no attempt for pairing from the other side the device will go to the Power Down state.

A blue LED blinking once in every 5 sec indicates that the backup device is in a protected state. If the backup device enters protected state from the Power Down state and not from Pairing State it issues the synchronisation request. If the synchronisation is cancelled from the mobile the backup device retries every 10 minutes until the synchronisation happens successfully. If the backup device is continuously switched ON for more than 24 hrs it shall issue synchronisation again.

Pressing Button 2 on backup device for more than 3 sec will issue a manual synchronisation request. If the backup device or mobile phone moves out of range or mobile is switched OFF, the backup device enters an Out of range state. Out of range state is indicated by the Buzzer alarm and Red LED blinking every second.

Pressing the Button 1 for more than 5 sec decouples the backup device from the mobile phone and switches OFF the backup device. The backup device turns the Buzzer ON and Red LED starts blinking every second upon the alarm request from mobile phone.

If the backup device finds that Battery has drained below the specified level (5%) it sends a Battery low indication to the mobile phone along with a beep on backup device as soon as it enters this state and also once per day if it is kept ON continuously.

Upon request from the mobile phone application, the backup device changes the passkey. Also, the backup device clears the non volatile memory upon request from the mobile phone.

If the backup device is in an Out of range State, the Buzzer alarm and Red LED blinking every second indicates this state. If the backup device or mobile phone is brought back in range, the Buzzer is turned OFF and the backup device couples with the mobile phone and enters Protected state. Pressing the Button 2 for more than 5 sec will mute the Buzzer. In this state if the backup device and mobile phone come back in range they get coupled and move into the protected state. The Buzzer will be un-muted. If this state does not change within 10 sec by either bringing back the mobile in range or Muting the Buzzer by pressing Button 2 for more than 3 sec Buzzer will alarm continuously for 10 sec and then start beeping ½ a second for every 10 sec.

The table below sets out the indications provided for different states of the backup device according to one embodiment.

| Sl. No | State | Indication |
| --- | --- | --- |
| 1 | Power down | Red and Blue LED OFF |
| 2 | Power up | Red LED blinking every 5 sec |
| 3 | Pairing state | Blue LED glowing Solid |
| 4 | Coupled state | Blue LED blinking every 5 sec |
| 5 | Out of range | Buzzer alarm and Red LED blinking every second |
| 6 | Alarm Request from the mobile phone | Buzzer alarm and Red LED blinking every second |

The table below indicates the Button options available with one embodiment of the backup device:

| Sl. No | Current state | Option | Button operation |
| --- | --- | --- | --- |
| 1 | Power down | Power ON | Button 1 press for more than 3 sec |
| 2 | Power down | Pairing mode | Button 1 press for more than 6 sec |
| 3 | Protected | Decouple and Power OFF | Button 1 press for more than 3 sec |
| 4 | Protected | Manual synchronisation | Button 2 press for more than 3 sec |
| 5 | Out of range | Mute the Buzzer | Button 2 press for more than 3 sec |

The operation of one embodiment of an application that may be implemented on a portable data storage device, such as a mobile telephone, in conjunction with the system described herein is set out in more detail below. The application described is an immobilization application.

To start the application, start the backup application on the mobile. It should display a help screen guiding the user to select the Options button. The mobile then displays a message such as:

"Welcome. To start select the Options button"

The Options button displays a list of available menus like:

"Locate Backup device
Tools
Help
Exit"

Upon selection of Locate Backup device menu item, the application will first check if BlueTooth™ is ON and will provide an option to the user to turn on BlueTooth™:

"BlueTooth™ not ON.
Turn it ON now?"

If the user cancels the operation, the application will return to the main menu. Otherwise, it will proceed to discover BlueTooth™ devices in the vicinity and display a list of devices using the standard BlueTooth™ display menu.

"Last devices found:
More devices
blah . . . blah1
blah . . . blah2"

If a device with which to pair is selected, the application will attempt to pair with the backup device with the default passkey (0000). If successful, a timed message will appear indicating the same and recommendation to change the passkey:

"Backup device successfully paired.
Please register your unique passkey."

Otherwise, the user will be prompted to re-enter the device passkey:

"Re-enter passkey: ****"

If at this point, the user cancels the operation, the user shall be returned to main Options and the device state is not protected. A hard icon displaying this would appear on the screen to indicate this state.

After approximately one second after successful pairing with default passkey, the user shall be prompted to register a unique passkey for the device and to recover from immobilise situation.

"Register unique passkey: ****"

Following this a dialog box will to validate the previously entered passkey. If the user typed a different pass key, the previous dialog box will reappear followed by the confirmation dialog until the user has it right:

"Re-enter passkey to confirm: ****"

Immediately after registering the passkey the mobile will attempt to synchronise with the device and display a dialog box as shown below, preferably with a progress bar:

"Synchronising with backup device"

At the end of this process, the backup device is synchronized and mobile is protected. A message box to announce this will appear. Also a hard icon to display this state shall be displayed.

"Congratulations! Mobile is now protected."

If the backup device happens to go out of range or is switched off and the mobile phone is in protected state, the immobilization application takes over and locks the phone. In this state, if the backup device happens to come back within the range of mobile or is switched on, the immobilization application shall automatically unlock the phone. The application shall produce a bleep sound to inform the user about this event.

In the immobilized state, the mobile phone shall be locked to prevent misuse. In this situation, a message prompt will appear as shown below. It provides an input box for entering a passkey to recover from the situation. Any ongoing calls shall not be affected if the mobile is protected. Immobilization comes into effect after the call has ended.

"Immobilised! Only emergency services.
Enter passkey to recover.
****"

In the immobilize state, the Option menu will be a limited functionality as shown below. On selecting the Emergency Calls menu, user may make only emergency calls. The user shall be able to take calls as well but no additional functionality would be available such as Caller Id display. The Accept/Reject call buttons would be active.

"Recover

Emergency Calls

Help"

On selecting the Recover menu, the application shall display the immobilized prompt as shown below. If the user attempts to enter the password more than 3 times, the phone shall initially prevent recovery for 5 min. The recovery menu shall be greyed out to indicate this. This interval will progressively increase to 10 min, 20 min, etc. if further attempts are carried out unsuccessfully.

"Recover

Emergency Calls

Help"

Limited set of functionality and user interface would be available during the immobilised state of mobile. The emergency services available would be dependent on the network provider and shall include:

Ability to make emergency calls

Ability to receive calls (without caller id info)

The backup device will attempt to synchronize the data with the mobile every day. However, priority would be given to other mobile events like placing and receiving calls, messages, camera and mobile applications over BlueTooth™. This can cause the sync to be deferred until next opportunity available during the day. If the sync is successful, next sync will be attempted after approximately one-day period.

The user may at any point of time choose to disable immobilisation functionality. This can be done using the Immobilise menu option. A dialog box with radio buttons will open showing the current setting. The user can navigate to the OFF position.

The application shall verify that it is an authorized request by prompting for the passkey as shown below. If a valid passkey is entered, the immobilisation functionality would be disabled.

"Please enter passkey to confirm: ****"

At any time after disabling immobilisation, if the user wishes to turn on the feature back again, the user can go to Option>Immobilisation. The dialog box as show in figure below will appear and user can navigate to the ON position to turn on the feature. No password confirmation will be needed for this case.

A user may choose to perform manual sync of information at any time with the coupled backup device. For this the user can select Options>Tools>Synchronise. A progress bar dialog box will come up indicating the status of transfer. At any time the user can cancel the task by pressing the Cancel button.

On successful completion of sync, the phone will display a message indicating the same.

"Congratulations!

Backup device is synchronised."

The user may change the passkey for the device. Upon selection of Options>Tools>Change passkey, the application shall prompt for the current passkey of the backup device. If the proper passkey was provided, the application shall ask the user to register new unique passkey and confirm the same as described earlier.

The user may also clear the memory of the backup device. Upon selection of Options>Tools>Clear memory on backup device, the application shall prompt for the passkey for this operation. After a further confirmation to proceed, the application shall send a message to the backup device for clearing the contact information.

The user shall be alerted about a low battery condition of backup device. The backup device will send an alert message once every 4 hours if the battery level falls below 5%. The application shall display a message when it receives the alert from backup device. Suitable hard icon would be displayed to reflect the low battery condition of backup device. Also if there is an ongoing call or any other event, the application shall defer the display low battery alert message.

"Attention!

Backup device low battery."

Usage of the mobile may be prevented if it is stolen and the SIM is removed from it. The backup application shall lock the SIM if the immobilization takes place and unlock the SIM if it comes out of immobilization.

Features of embodiments of the system described herein are summarised below. It will be appreciated that embodiments of the system may implement some of the features set out below and in any combination.

Data Storage a. Contacts b. Text messages c. Pictures d. Files (pictures, documents, music files)

e. Settings f. Ring tones g. Personal sensitive information h. Personal medical information.

Alarm a. LED b. Buzzer c. Vibrator d. Handset ring tone

Immobilization a. Immobilization for Phone and SIM b. Sending text messages to the network c. Remote locking for mobile phones Broadcast of Emergency Information I-Migo Tags Access Control a. For buildings b. For Computers Digital Rights Management (DRM)

Piconet for additional devices and device types a. I-Migo along with a Headset or Hands free device.

b. I-Migo along with other device types such as laptops and digital cameras.

Provision for Memory Card (SD Card)

An in-built MP3 player

USB Download option for upgrades

LCD with scroll and input option

Different embodiments of the device may be designed for specific purposes e.g. Hands Free alone, Data storage with Hands Free.

Different IDs

Sponsorship

Different Versions of the backup device may be provided, for example:

1. The backup device as a basic storage device.

2. The backup device as an enhanced data storage device to be able to store additional types of objects like messages, pictures, documents and music files.

3. The backup device as a Hands Free device supporting only the hands free features.

4. The backup device as a data storage device with Hands Free capabilities.

5. The backup device as Hands Free device with audio playback of music files stored on the backup device or the portable data storage device, for example playback of MP3 files.

6. The backup device functioning as tags (Security tags).

Figure 8:
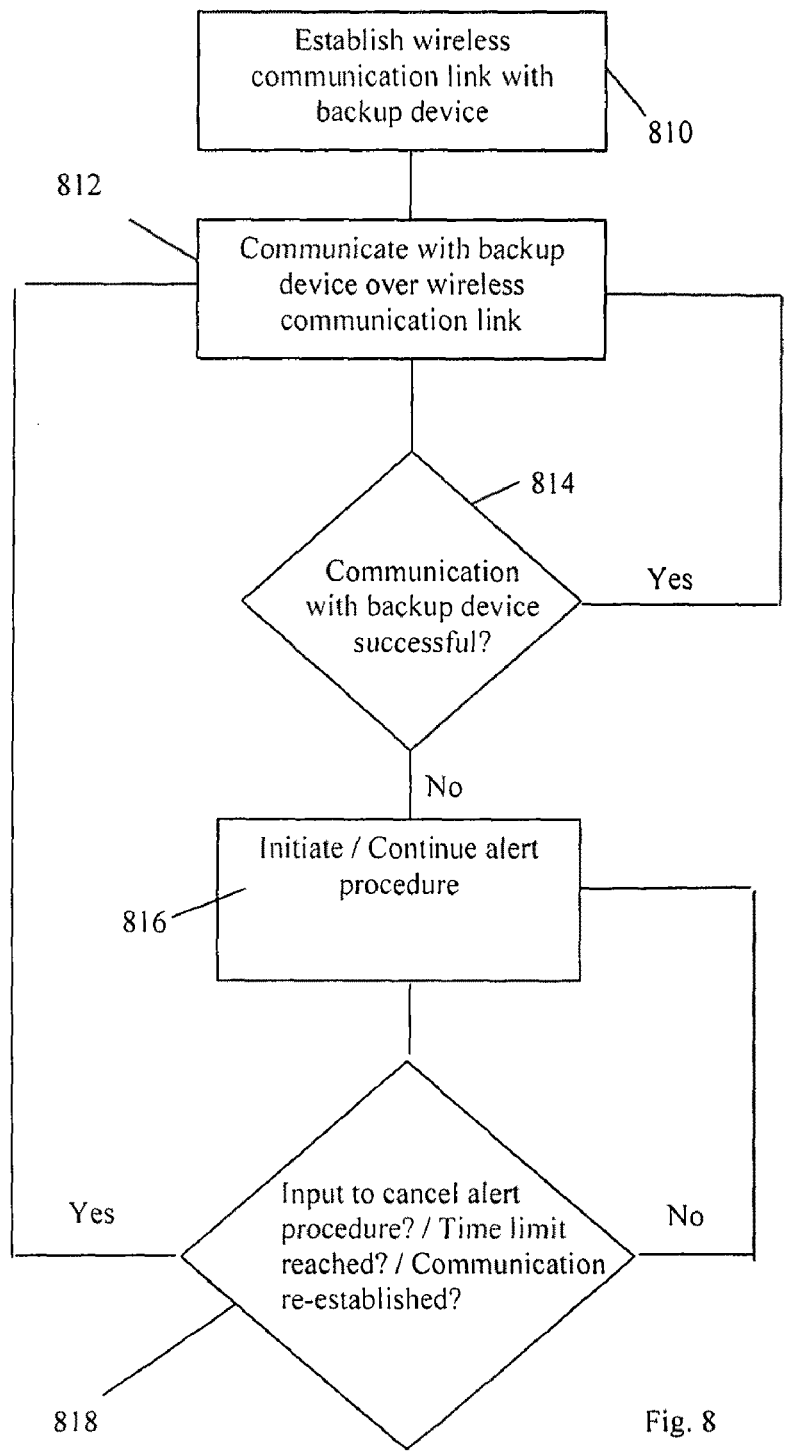
FIG. 8 is a schematic drawing of a method of operating a communication link between a portable storage device and a backup device.

A further embodiment of the system will now be described in more detail with reference to FIG. 8. The steps shown in FIG. 8 are illustrative steps in one possible implementation of the system, but the figure is not intended to be limiting and some steps may be omitted in some embodiments, or additional steps may be added. Features of the systems and methods described above may be implemented in conjunction with the present embodiment.

As described above, a communication link may be established over a wireless interface 810, preferably a Blue-Tooth™ interface, between a portable data storage device, such a mobile telephone or a PDA, and a backup device. The portable data storage device and the backup device communicate 812 over the communication link for as long as the communication link is available 814. If communication with the backup device is unsuccessful 814, for example if the backup device and portable data storage device become separated over such a distance that the communication link is broken, an alert procedure is initiated 816. The alert procedure may be initiated at the portable data storage device or at the backup device or both. Further details of possible alert procedures are set out below.

The alert procedure may continue until an input is received from a user to cancel the alert procedure 818. The input may be received at the portable data storage device or the backup device or at both devices.

In an alternative embodiment, the alert procedure may be implemented only for a predetermined period of time. Alternatively, the alert procedure may continue until communication has been re-established between the portable data storage device and the backup device.

As described above, the alert procedures may include any of the following procedures, or a combination of two or more of the procedures:

disabling at least one function of the portable data storage device, for example disabling one or more buttons on the keypad of the device, or disabling a transmitter or receiver of the device; rendering the portable data storage device at least partially inoperable in the absence of communication from the backup device, for example by preventing access to data or files or rendering data transmission or reception functionality inoperable to prevent use of the device to make or receive telephone calls or messages, such as text messages;

locking the portable data storage device, which could be done by locking the keypad of the device, for example requiring a code to unlock the device;

generating an audible, visible or vibrational signal, which may be done at the portable data storage device, at the backup device, or both and more than one type of signal may be generated, which may be configurable by the user;

restricting access to certain functions of the portable data storage device, for example, the ability to access data may be restricted, but it may be possible to use a camera associated with the device in alert mode;

preventing use of the portable data storage device except to telephone a specified number to report the device as lost or to re-enable the device, for example, a user or a person who has found a lost portable data storage device may be able to call a single helpline number using the device to re-enable the device or find a way to return it to a user;

communicating a unique identifier of the portable data storage device to a network, for example, a number associated with network access, such as a SIM card number, IMEI number, mobile telephone number for a phone, or MAC address for the device. This may enable an operator to block use of the device remotely or assist in tracking the device.

Alternative alert procedures set out in the preceding description above may also be implemented.

The type of alert procedure initiated by separation of the portable data storage device from the backup device may be pre-configured or may be selected by the user. A user may have more than one alert profile, for example, a "city" alert profile may disable the portable data storage device and cause an audible and vibrational alarm to be generated at the backup device. A "home" alert procedure may simply lock the keypad of the portable data storage device, requiring a user to enter a particular sequence of numbers to unlock the device.

As will be clear to one skilled in the art, embodiments of the device may incorporate any one or more of the features described above. For example, features such as hands-free operation of a portable data storage device may be provided independently or in conjunction with other features, such as the data backup features.

The above description is provided by way of example only and modifications of detail may be provided.

The invention claimed is:

1. A method of operating a portable data storage device having a short range wireless communication interface, the method comprising:

preregistering a portable data storage device with a backup device in an authorization mode and then creating a secure pairing between the portable data storage device and the backup device to enable secure communication between the portable data storage device and the backup device over the wireless communication link, wherein the portable data storage device and the backup device are preregistered using a first key code and a secure pairing is created using a second key code;

communicating with the backup device over a wireless communication link using a short range wireless communication interface, wherein communicating with the backup device comprises communicating periodically or quasi-continuously between the backup device and the portable data storage device to monitor for separation of the backup device from the portable data storage device; and initiating an alert procedure on separation of the backup device from the portable data storage device wherein the alert procedure comprises disabling at least one function of the portable data storage device.

2. The method according to claim 1 wherein the alert procedure comprises at least one procedure selected from the group of procedures consisting of:

rendering the portable data storage device at least partially inoperable in the absence of communication from the backup device;

locking the portable data storage device;

generating an audible, visible or vibrational signal;

restricting access to certain functions of the portable data storage device;

preventing use of the portable data storage device except to telephone a specified number to report the device as lost or to re-enable the device; and communicating a unique identifier of the portable data storage device to a network.

3. The method according to claim 1 further comprising receiving an input from a user to override the alert procedure.

4. The method according to claim 1 wherein communicating comprises transmitting data from the portable data storage device to the backup device.

5. The method according to claim 1 wherein the data comprises at least one type of data selected from the group consisting of:
- an IMEI number associated with the portable data storage device;
- a unique identifier of a subscriber module associated with the portable data storage device; and
- user profile data for the portable data storage device, preferably a PIN code used to access the portable data storage device.

6. The method according to claim 1 comprising transmitting data automatically on connection to the backup device.

7. A portable data storage device having a short range wireless communication interface and configured to communicate with a backup device over a wireless communication link, wherein communicating with the backup device comprises communicating periodically or quasi-continuously between the backup device and the portable data storage device to monitor for separation of the backup device from the portable data storage device, the device further comprising an alerting device for initiating an alert procedure on separation of the backup device from the portable data storage device, the device for initiating an alert procedure comprising an alerting device for disabling at least one function of the portable data storage device;
- wherein the portable data storage device and the backup device preregister over the wireless communication link before a secure pairing is created between the portable data storage device and the backup device, and
- wherein the portable data storage device preregisters the backup device over the wireless communication link using a first key code and wherein the secure pairing is created using a second key code.

8. The portable data storage device according to claim 7 wherein the device for initiating the alert procedure comprises at least one alerting device selected from the group of alerting devices consisting of:
- an alerting device for rendering the portable data storage device at least partially inoperable in the absence of communication from the backup device;
- an alerting device for locking the portable data storage device;
- an alerting device for generating an audible, visible or vibrational signal;
- an alerting device for restricting access to certain functions of the portable data storage device;
- an alerting device for preventing use of the portable data storage device except to telephone a specified number to report the device as lost or to re-enable the device; and
- an alerting device for communicating a unique identifier of the portable data storage device to a network.

9. The portable data storage device according to claim 7 wherein the alert procedure is initiated at the portable data storage device at the backup device or at both the portable data storage device and the backup device.

10. The portable data storage device according to claim 7 further comprising a device for enabling the user to override the alert procedure.

11. The portable data storage device according to claim 7 further comprising a transmitter for transmitting data to the backup device.

12. The portable data storage device according to claim 11 wherein the data comprises at least one type of data selected from the group consisting of:
- a unique identifier of a subscriber module associated with the portable data storage device; and
- user profile data for the portable data storage device, preferably a PIN code used to access the portable data storage device.

* * * * *